US009113337B2

(12) United States Patent
Sugitani

(10) Patent No.: US 9,113,337 B2
(45) Date of Patent: Aug. 18, 2015

(54) RADIO COMMUNICATION APPARATUS

(71) Applicant: Panasonic Corporation, Osaka (JP)

(72) Inventor: Toshiyuki Sugitani, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 22 days.

(21) Appl. No.: 14/219,955

(22) Filed: Mar. 19, 2014

(65) Prior Publication Data

US 2014/0286490 A1 Sep. 25, 2014

(30) Foreign Application Priority Data

Mar. 21, 2013 (JP) .................................. 2013-058510

(51) Int. Cl.
*H04W 12/08* (2009.01)
*H04L 29/06* (2006.01)
*H04W 12/02* (2009.01)
*H04W 12/04* (2009.01)

(52) U.S. Cl.
CPC ........... *H04W 12/08* (2013.01); *H04L 63/0428* (2013.01); *H04W 12/02* (2013.01); *H04W 12/04* (2013.01)

(58) Field of Classification Search
CPC .......................... H04W 12/08; H04W 63/0428
USPC .......... 380/270, 279, 282; 713/155, 165, 164, 713/189
See application file for complete search history.

(56) References Cited

U.S. PATENT DOCUMENTS

| 6,889,324 | B1 | 5/2005 | Kanai et al. |
| 7,774,605 | B2 | 8/2010 | Kanai et al. |
| 7,933,414 | B2* | 4/2011 | Bauchot et al. ............... 380/279 |
| 2005/0166044 | A1 | 7/2005 | Kanai et al. |
| 2005/0166057 | A1 | 7/2005 | Kanai et al. |
| 2008/0019514 | A1* | 1/2008 | Stromberg et al. ............. 380/46 |
| 2012/0131354 | A1* | 5/2012 | French .......................... 713/189 |

FOREIGN PATENT DOCUMENTS

| JP | 11-109854 A | 4/1999 |
| JP | 2000-215379 A | 8/2000 |
| JP | 2001-005384 A | 1/2001 |
| JP | 2003-032236 A | 1/2003 |

(Continued)

OTHER PUBLICATIONS

"Robust Key Generation from Signal Envelopes in Wireless Networks"—Azimi-Sadjadi et al, PSU, Oct. 2007 http://citeseerx.ist.psu.edu/viewdoc/download?rep=rep1&type=pdf&doi=10.1.1.123.496.*

(Continued)

*Primary Examiner* — Randy Scott
(74) *Attorney, Agent, or Firm* — Seed IP Law Group PLLC

(57) ABSTRACT

An inexpensive radio communication apparatus is provided which can safely generate and share a key to be used for encryption/decryption and lower the possibility of loss of the key even if a packet error occurs at the time of reestablishment of a radio link. When a request for position registration that is made to a base unit is not a request made by encrypted communication using a common encryption key, the base unit transmits a message to request generation of an initial encryption key, and when a handset correctly responds to the message, both the base unit and the handset store information on the initial encryption key.

16 Claims, 16 Drawing Sheets

(56) References Cited

FOREIGN PATENT DOCUMENTS

| | | |
|---|---|---|
| JP | 2006-270366 A | 10/2006 |
| JP | 2007-110487 A | 4/2007 |
| JP | 2010-109954 A | 5/2010 |

OTHER PUBLICATIONS

ETSI EN 300 444 V2.3.1, "Digital Enhanced Cordless Telecommunications (DECT); Generic Access Profile (GAP)," Apr. 2012, 154 pages.

* cited by examiner

RADIO COMMUNICATION APPARATUS

CROSS REFERENCE TO RELATED APPLICATIONS

This application is entitled to the benefit of Japanese Patent Application No. 2013-058510 filed on Mar. 21, 2013, the disclosure of which including the specification, drawings and abstract is incorporated herein by reference in its entirety.

TECHNICAL FIELD

The present invention relates to radio communication apparatuses on the base unit side and the handset side and also to an encryption key generation method, which are usable for a cordless telephone, for example.

BACKGROUND ART

In radio communication, control data and speech data are encrypted and transmitted for the improvement of security performance. Radio communication used by a general person such as a cordless telephone widely adopts a common key cryptosystem in which the same key is used for both encryption and decryption. In the radio communication of the cordless telephone, for improved convenience, the key to be used in the common key cryptosystem is automatically generated, and the common key is shared between the base unit and the handset.

CITATION LIST

Patent Literature

PTL 1
Japanese Patent Application Laid-Open No. 2001-5384

Non-Patent Literature

NPL 1
ETSI EN 300 444 V2.3.1 (2012-04): "Digital Enhanced Cordless Telecommunications (DECT); Generic Access Profile (GAP)"

SUMMARY OF INVENTION

Technical Problem

An object of the present invention is to provide a radio communication apparatus that safely generates a key used for encryption/decryption with minimum steps, that allows the generated key to be shared between the base unit and the handset, that lowers the risk of loss of the key even if a packet error occurs at the time of reestablishment of a radio link, and that is inexpensive.

Solution to Problem

A base-unit-side (master-side) radio communication apparatus according to an aspect of the present invention includes a section that transmits, when receiving an unencrypted signal from a handset-side radio communication apparatus, a signal to request generation of a new common encryption key to the handset-side radio communication apparatus using an unencrypted signal.

Moreover, a base-unit-side radio communication apparatus according to an aspect of the present invention includes a section that, when receiving a signal to request encrypted communication with a specified encryption key from a handset-side radio communication apparatus, a signal to reject the encrypted communication to the handset side radio communication apparatus in a case where the base-unit-side radio communication apparatus does not store the specified encryption key, and that transmits a signal to request generation of an initial encryption key to the handset side radio communication apparatus when a position registration request that is not encrypted using the encryption key is received from the handset side radio communication apparatus.

Advantageous Effects of Invention

According to the present invention, it is possible to provide a radio communication apparatus that safely generates a key used for encryption/decryption with minimum steps, that allows the generated key to be shared between the base unit and the handset, that lowers the risk of loss of the key even if a packet error occurs at the time of reestablishment of a radio link, and that is inexpensive.

DESCRIPTION OF EMBODIMENTS

Embodiment 1

[Configuration of Cordless Telephone]

Figure 1:
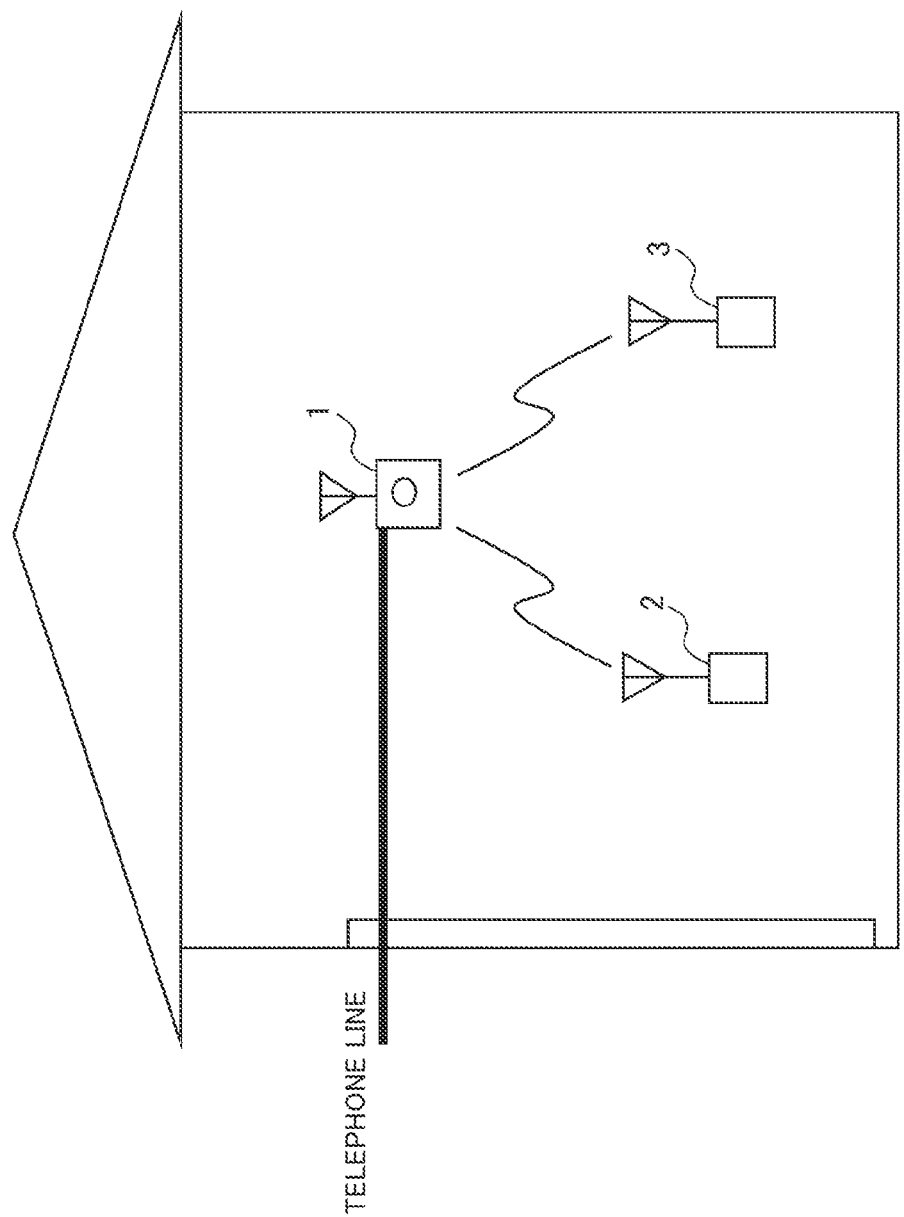
FIG. 1 shows a diagram illustrating an example of a cordless telephone using a radio communication apparatus according to Embodiment 1 of the present invention.

FIG. 1 shows a diagram illustrating an example of a cordless telephone using a radio communication apparatus according to the present embodiment. FIG. 1 illustrates an example where the cordless telephone includes base unit (master-side) 1 and handsets (e.g., slave-side) 2 and 3. Base unit 1 is connected with a telephone line. For example, base unit 1 can perform communication with handsets 2 and 3 by radio communication in the DECT (Digital Enhanced Cordless Telecommunication) system. Handsets 2 and 3 can make an external telephone call or internal telephone call via base unit 1.

[Configuration of Base Unit 1]

Figure 2:
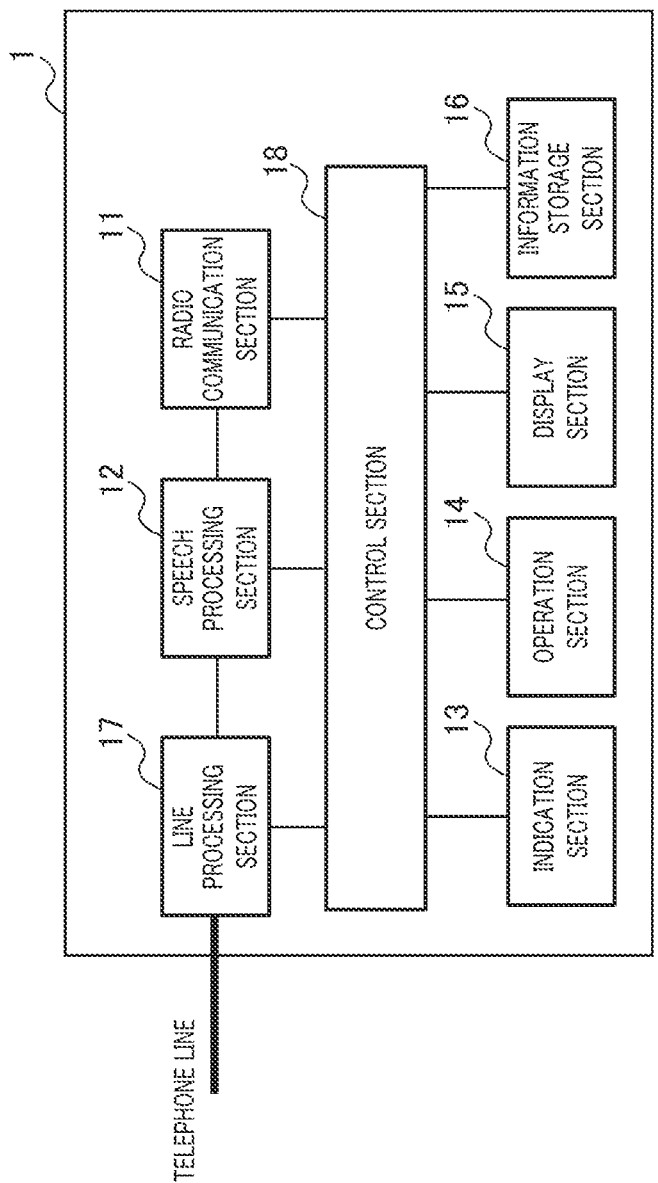
FIG. 2 shows a block diagram illustrating a configuration example of a base unit according to Embodiment 1 of the present invention.

FIG. 2 shows a block diagram illustrating a configuration example of base unit 1. As illustrated in FIG. 2, base unit 1 includes radio communication section 11, speech processing section 12, indication section 13, operation section 14, display section 15, information storage section 16, line processing section 17 and control section 18.

Radio communication section 11 transmits and receives control data and speech data for radio link establishment or external telephone call in a predetermined system, and in the case of encrypted communication, encrypts transmitted data and decrypts received data. Note that, in this specification, the term "radio communication" includes radio transmission and radio reception.

Speech processing section 12 converts a speech signal input from a telephone line or a microphone (which is not illustrated in the figure) into a digital signal to generate speech data for transmission, and converts received speech data into an analog signal to output it to the telephone line or a speaker (which is not illustrated in the figure).

Indication section 13 outputs indication sound in response to an incoming call from the external line or internal paging from handset 2 or 3. Examples of the indication sound include a ringer sound.

Operation section 14 includes buttons to receive the user's operation. Examples of the user's operation include operation to make a call (outgoing call operation), operation to receive a call (incoming call operation) and operation to register a handset (handset registration operation), and the like.

Display section 15 displays information for the user. Examples of the information include a telephone number, registration information and an operation menu of handset 2, and the like.

Information storage section 16 stores information on the identification code of base unit 1 (which is referred to as "base unit ID" below) and a handset registered in base unit 1. Information storage section 16 includes a nonvolatile memory such as an EEPROM. Information on the handset to be stored in information storage section 16 is the identification code of the handset (which is referred to as "handset ID" below) and an authentication key to identify and authenticate the registered handset, an encryption index to be used for encrypted communication and an encryption key to be stored in pair with the encryption index.

Line processing section 17 is an interface with the telephone line and achieves telephonic transmission and telephonic reception. Control section 18 controls the entire operation of base unit 1 in cooperation with each section described above. The control made by control section 18 is described hereinafter in detail. Base unit 1 includes, for example, a CPU (Central Processing Unit), a storage medium such as a ROM (Read Only Memory) that stores a control program, and a work memory such as a RAM (Random Access Memory). In this case, the function of control section 18 is achieved by executing the control program by the CPU.

Note that, function sections included in base unit 1 are not limited to the components denoted by reference numerals 11 to 18 in FIG. 2 and may include other function sections. Such additional function sections may be the ones to achieve a primary function of base unit 1 or to achieve an auxiliary function to assist the primary function.

[Configuration of Handsets 2 and 3]

Figure 3:
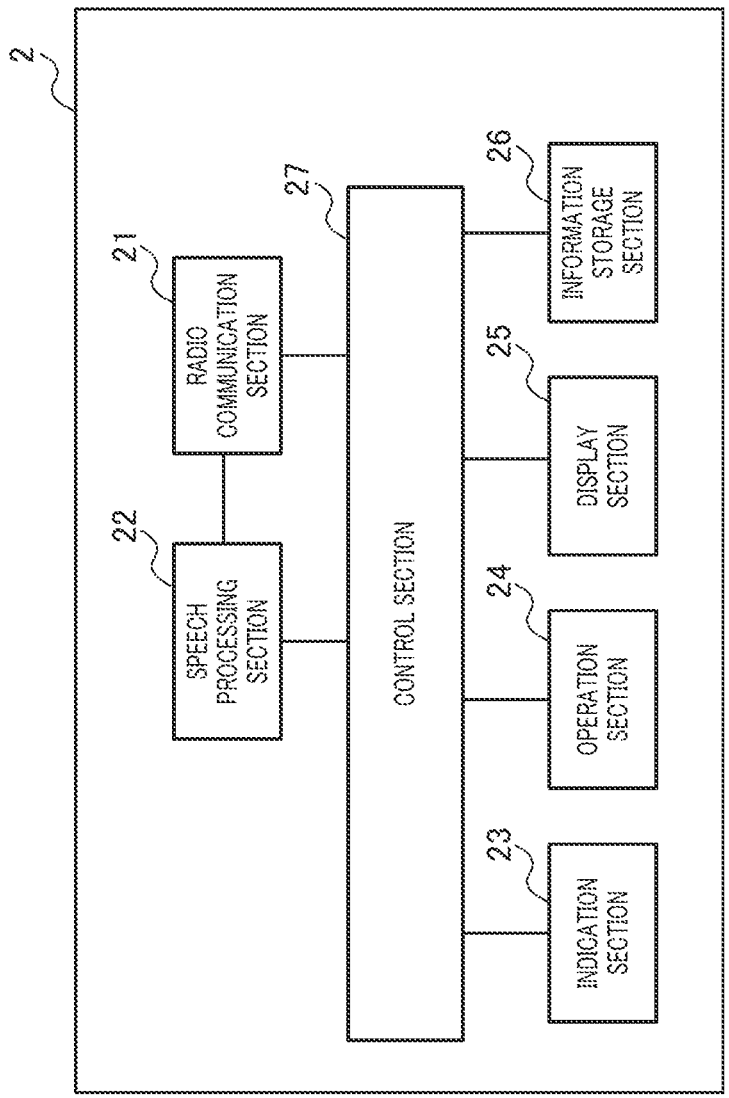
FIG. 3 shows a block diagram illustrating a configuration example of a handset according to Embodiment 1 of the present invention.

FIG. 3 shows a block diagram illustrating a configuration example of handsets 2 and 3. As illustrated in FIG. 3, handsets 2 and 3 include radio communication section 21, speech processing section 22, indication section 23, operation section 24, display section 25, information storage section 26 and control section 27. Hereinafter, a description is given using handset 2 as an example.

Radio communication section 21 transmits and receives control data and speech data for radio link establishment or external telephone call in a predetermined system, and in the case of encrypted communication, encrypts transmitted data and decrypts received data.

Speech processing section 22 converts a speech signal input from a microphone (which is not illustrated in the figure) into a digital signal to generate speech data for transmission and converts received speech data into an analog signal to output it to a speaker (which is not illustrated in the figure).

Indication section 23 outputs an indication sound in response to an incoming call from the external line or internal paging from base unit 1 or handset 3. Examples of the indication sound include a ringer sound.

Operation section 24 includes buttons to receive the user's operation. Examples of the user's operation include operation to make a call (outgoing call operation), operation to receive a call (incoming call operation) and operation to register a handset (handset registration operation), and the like.

Display section 25 displays information for the user. Examples of the information include the telephone number and an operation menu of handset 2, and the like.

Information storage section 26 stores the handset ID of handset 2, the base unit ID of a registered base unit (i.e., base unit 1), an authentication key, and an encryption index and an encryption key to be used for encrypted communication. Information storage section 26 includes a nonvolatile memory such as an EEPROM.

Control section 27 controls the entire operation of handset 2 in cooperation with each section described above. The control made by control section 27 is described hereinafter in detail. Handset 2 includes, for example, a CPU (Central Processing Unit), a storage medium such as a ROM (Read Only Memory) that stores a control program, and a work memory such as a RAM (Random Access Memory). In this case, the function of control section 27 is achieved by executing the control program by the CPU.

Note that, function sections included in handset 2 are not limited to the components denoted by reference numerals 21 to 27 in FIG. 3 and may include other function sections. Such additional function sections may be the ones to achieve a primary function of handset 2 or to achieve an auxiliary function to assist the primary function.

[Operation of Base Unit 1 and Handset 2]

In the following, an operation example of the above-mentioned cordless telephone using the radio communication apparatus of the present invention is described.

Figure 4:
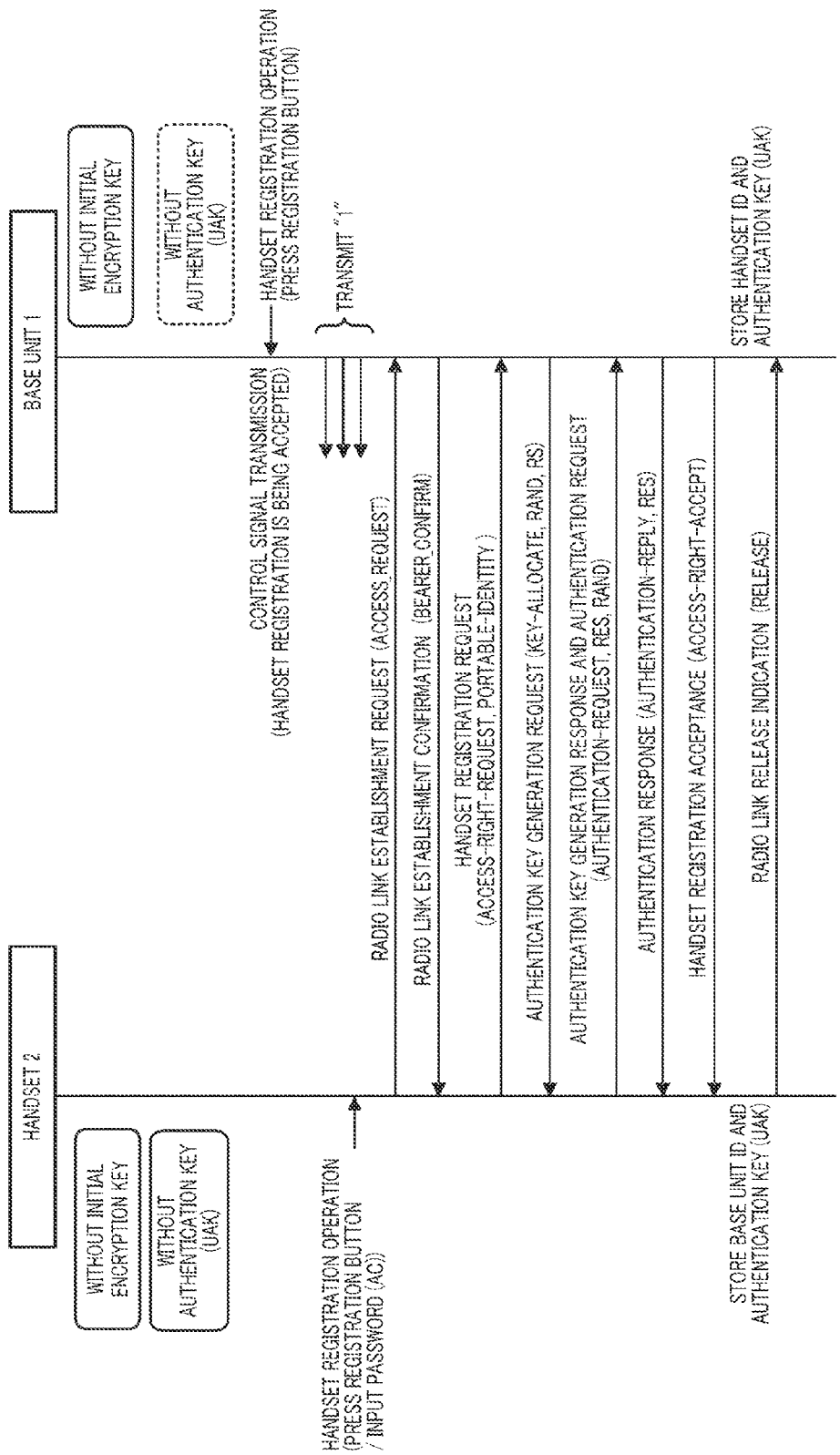
FIG. 4 shows a diagram illustrating an example of signals to be transmitted and received by radio communication between a base unit and a handset at the time of registering the handset according to Embodiment 1 of the present invention.

FIG. 4 shows a diagram illustrating an example of signals to be transmitted and received by radio communication between base unit 1 and handset 2 at the time of handset registration. The handset registration is an operation for pairing of a base unit and a handset, and is basically performed only one time in the first startup. In the handset registration, the exchange of the base unit ID and the handset ID to identify the devices is performed. Moreover, in the handset registration, an authentication key (UAK) to be used in an authentication sequence to confirm whether it is the valid communication party is generated. This authentication key (UAK) is generated using a password to be input only one time by an operator when the handset is registered. For example, in radio communication of the DECT system, the handset registration sequence is called "Access rights procedure." The generation of the authentication key (UAK) is described in detail, hereinafter.

As illustrated in FIG. 4, the handset registration is started by pressing the registration buttons of base unit 1 and handset 2. When the registration button of operation section 14 is pressed, base unit 1 indicates that base unit 1 is accepting handset registration, using a control signal. For example, in the case of radio communication in the DECT system, transmitting "1" with "access rights requests supported" of "higher layer capabilities" of "fixed part capabilities" to be transmitted by the dummy bearer indicates that the base unit is accepting handset registration. Meanwhile, when the registration button of operation section 24 is pressed and a password is entered, handset 2 searches for the base unit that indicates that the base unit is accepting handset registration, and when the base unit that processes the request for registration is found, starts radio communication for the handset registration.

In the handset registration, first, handset 2 transmits a radio link establishment request message to request the start of radio communication (for example, "access_request" that is a message for the control of the MAC layer in the case of the radio communication of the DECT system). Upon receipt of the radio link establishment request, base unit 1 transmits a radio link establishment confirmation message (for example, in the case of the radio communication of the DECT system, "bearer_confirm" that is a message for MAC layer control) and activates a radio communication channel between base unit 1 and handset 2.

Next, handset 2 transmits a handset registration request (for example, in the case of the radio communication of the DECT system, {ACCESS-RIGHTS-REQUEST} that is a message of the NWK layer) to request the handset registration. Base unit 1 having received the handset registration request confirms the validity of the handset while transmitting an authentication key generation request (for example, in the case of the radio communication of the DECT system, {KEY-ALLOCATE} that is a message of the NWK layer) to generate an authentication key. Upon receipt of the authentication key generation request, handset 2 transmits a message for an authentication key generation response and authentication request (for example, in the case of the radio communication of the DECT system, {AUTHENTICATION-REQUEST} that is a message of the NWK layer). A common authentication key between base unit 1 and handset 2 is generated by these handset registration sequences.

This common authentication key between base unit 1 and handset 2 is generated by predefined calculation on the basis of the password manually input when the user registers the device as described above, and is stored in base unit 1 and handset 2. For example, in the DECT system, which is used in Europe, this authentication key is called "user authentication key (which is referred to as "UAK" below)," and temporarily stored in information storage section 26 of handset 2 and information storage section 16 of base unit 1.

Base unit 1 transmits messages for an authentication response (for example, in the case of the radio communication of the DECT system, {AUTHENTICATION-REPLY} that is a message of the NWK layer) and handset registration acceptance (for example, in the case of the radio communication of the DECT system, {ACCESS-RIGHTS-ACCEPT} that is a message of the NWK layer) to handset 2.

Upon receipt of the handset registration acceptance from base unit 1, handset 2 transmits a radio link release indication (for example, in the case of the radio communication of the DECT system, "release" that is a message for the control of the MAC layer) and finishes the handset registration operation. Upon receipt of this radio link release indication, base unit 1 finishes the handset registration operation.

When the above-mentioned handset registration sequence is correctly finished, handset 2 stores the authentication key (UAK) generated in the handset registration sequence and the base unit ID in information storage section 26. Base unit 1 stores the authentication key (UAK) generated in the handset registration sequence and the handset ID in information storage section 16.

Note that, upon returning to normal operation, base unit 1 transmits the base unit ID by a control signal. Moreover, handset 2 acquires the base unit ID in base unit search operation to find the base unit that is accepting the registration. Moreover, the handset ID is notified to the base unit as one of information to be notified by the handset registration request message. For example, in the case of the radio communication in the DECT system, a message to indicate the base unit ID to be transmitted by base unit 1 is "identities information (NT)" of the MAC layer and information to indicate the handset ID is "<<PORTABLE-IDENTITY>> identity value" of the NWK layer.

In the following, operation after the radio link establishment in FIG. 4 is described in detail. In FIG. 4, when handset 2 transmits a handset registration request to base unit 1, base unit 1 having received the handset registration request transmits an authentication key generation request to confirm the validity of handset 2 to handset 2. That is, base unit 1 transmits the authentication key generation request including "RAND" and "RS" that are random numbers generated in base unit 1, to handset 2.

In base unit 1, the authentication key (UAK) is generated by calculation using a preregistered password stored in information storage section 16 and RAND and RS transmitted by a radio signal. Similarly, in handset 2, the authentication key (UAK) is generated by calculation using a password input by operation section 24 at the time of startup of the handset registration and RAND and RS received by a radio signal. The authentication keys (UAK) generated in base unit 1 and handset 2 are stored in information storage section 16 and information storage section 26.

Upon receipt of the authentication key generation request (KEY-ALLOCATE, RAND, RS) transmitted from base unit 1, handset 2 transmits an authentication key generation response and authentication request to base unit 1. At that time, handset 2 finds the authentication key (UAK) and the numerical value for an authentication key generation response to base unit 1 by predefined calculation based on the password input by operation section 24 at the time of the startup of the handset registration described above and RAND and RS transmitted together with the authentication key generation request from base unit 1, and transmits the numerical value for the authentication key generation response to base unit 1. For example, in the case of the radio communication of the DECT system, this numerical value for the authentication key generation response is called "RES." Moreover, handset 2 generates a random number in the handset, includes above-mentioned RES and RAND that is the random number to be generated in the handset in an authentication key generation response and authentication request (AUTHENTICATION-REQUEST, RES, RAND) to be transmitted from handset 2 to base unit 1, and transmits them to base unit 1. This RES is used in base unit 1 to determine whether the password input by handset 2 is equal to the password stored in base unit 1 and whether the authentication key (UAK) generated in handset 2 equals to the authentication key (UAK) generated in base unit 1, that is, it is used as the numerical value for handset authentication.

Moreover, base unit 1 having received the authentication key generation response and authentication request extracts RES from this authentication key generation response and authentication request and finds an authentication key (UAK) and the numerical value (RES) to be received by an authentication key generation response, by predefined calculation based on the password stored in information storage section 16 and RAND and RD transmitted beforehand to handset 2. Further, the numerical value (RES) found by the predefined calculation in base unit 1 and the numerical value (RES) transmitted from handset 2 are compared to determine whether both are matched. In a case where both are matched, base unit 1 transmits an authentication response (AUTHENTICATION-REPLY) to handset 2 next. Further, base unit 1 stores the above-mentioned authentication key (UAK) and the ID of that handset 2 in information storage section 16 in association with each other.

Moreover, base unit 1 finds the numerical value by predefined calculation based on the above-mentioned authentication key (UAK), RS transmitted to handset 2 by the authentication key generation request and RAND transmitted together with the authentication key generation response and authentication request from handset 2, and transmits this numerical value (RES) together with the authentication response. Here, RES transmitted from above-mentioned base unit 1 is used in handset 2 to determine whether the authentication key (UAK) generated in base unit 1 is equal to the authentication key (UAK) generated in handset 2, that is, it is used as the numerical value for base unit authentication.

Handset 2 having received the authentication response from base unit 1 extracts RES from this authentication response, finds the numerical value by predefined calculation based on the above-mentioned authentication key (UAK), RS received from base unit 1 and RAND transmitted beforehand to base unit 1, and determines whether both are matched. In a case where both are matched, handset 2 stores the above-mentioned authentication key (UAK) and the ID of that base unit 1 in information storage section 26 in association with each other.

In the following, RES to be transmitted from handset 2 to base unit 1 and determine in base unit 1 whether handset 2 has a right key, is called "RES for handset authentication." Moreover, RES to be transmitted from base unit 1 to handset 2 and determined in handset 2 whether base unit 1 has a right key, is called "RES for base unit authentication."

Figure 5A:
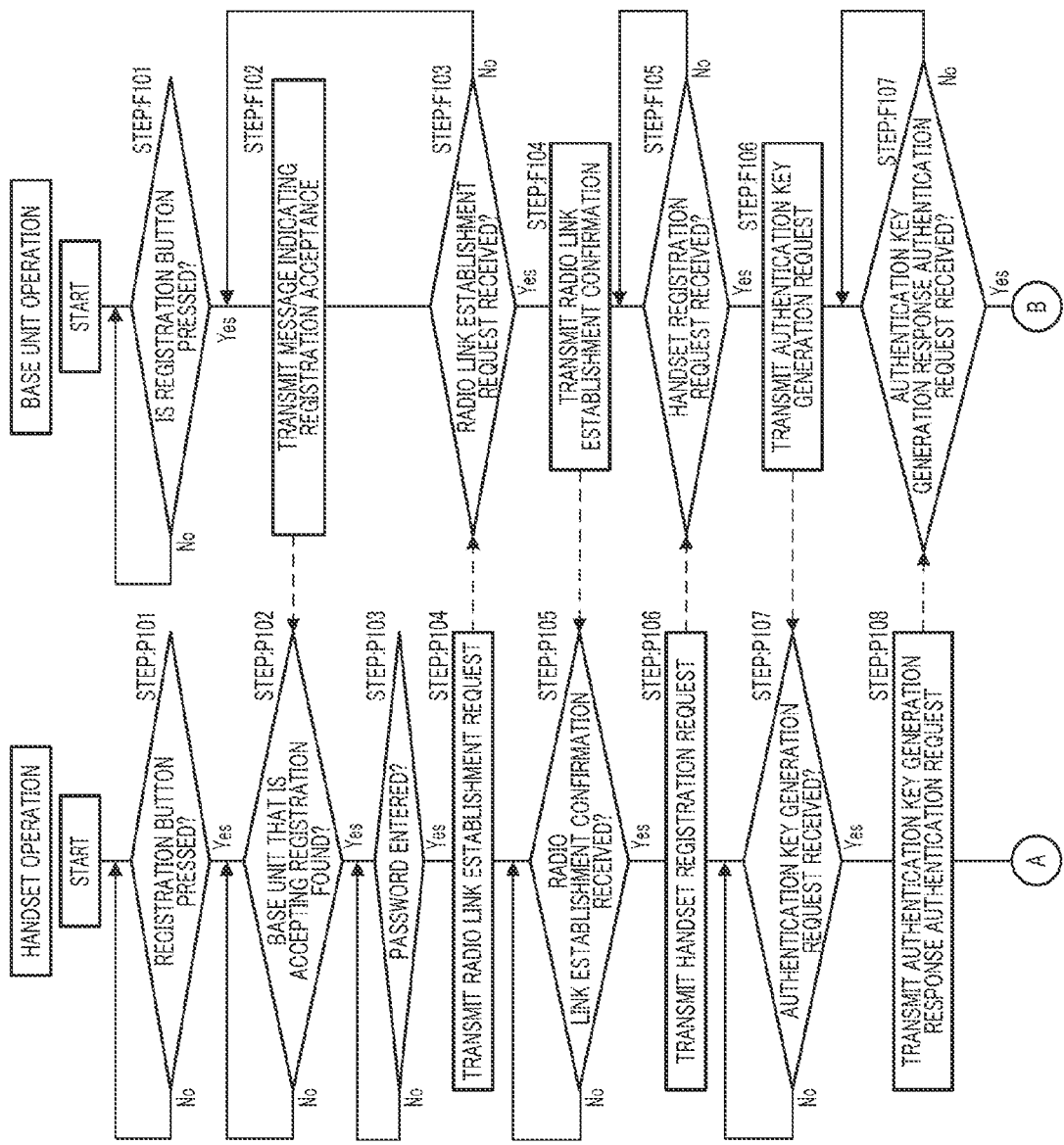
FIG. 5A shows a flowchart illustrating an example of operation between a base unit and a handset at the time of registering the handset according to Embodiment 1 of the present invention.
Figure 5B:
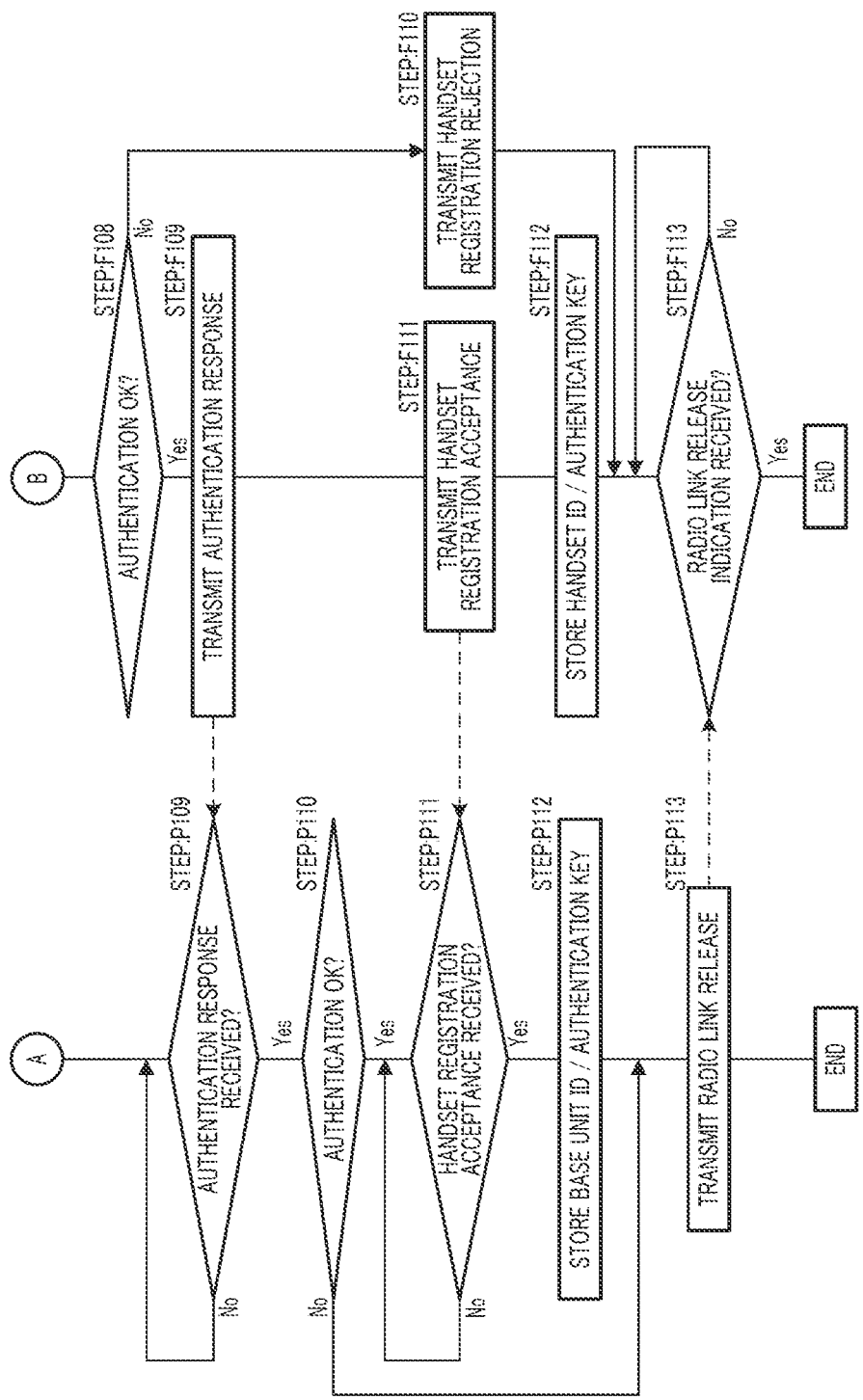
FIG. 5B shows a flowchart illustrating an example of operation between a base unit and a handset at the time of registering the handset according to Embodiment 1 of the present invention.

Next, operation for handset registration is described using FIG. 5A and FIG. 5B. FIG. 5A and FIG. 5B show a flowchart illustrating one example of operation of base unit 1 and handset 2 at the time of handset registration.

When the power is turned on, handset 2 enters a state to wait for the press of a registration button (Step: P101), and similarly, base unit 1 enters a state to wait for the press of a registration button (Step: F101).

When the registration button of operation section 14 is pressed (Step: F101, Yes), base unit 1 starts transmission of a message to indicate that base unit 1 is accepting handset registration by a control signal (Step: F102). That is, control section 18 transmits a message showing that base unit 1 is accepting the handset registration, and controls radio communication section 11 so that a radio link establishment request is received from handset 2 (Step: F103).

When the registration button of operation section 24 is pressed (Step: P101, Yes), handset 2 starts finding base unit 1 that is accepting the registration (Step: P102). That is, control section 27 causes radio communication section 21 to enter a reception state, searches for a message showing that the handset registration is being accepted, from the received data, and determine base unit 1 that transmits the message showing that it is accepting the handset registration (Step: P102, Yes). Further, control section 27 receives and stores the base unit ID transmitted by that base unit 1. Thereafter, when a password is entered from operation section 24 (Step: P103, Yes), control section 27 transmits a radio link establishment request, controls radio communication section 21 so that a radio link establishment confirmation is received from base unit 1 (Step: P104), and waits for the radio link establishment confirmation (Step: P105).

In Step: F103, control section 18 of base unit 1 waits for the radio link establishment request from handset 2, and when a certain period of time passes (Step: F103, No), returns to Step: F102 and retransmits a message showing that it is accepting the handset registration. On the other hand, upon receipt of the radio link establishment request from handset 2 in Step: F103 (Step: F103, Yes), control section 18 controls radio communication section 11 so that the radio link establishment confirmation is transmitted (Step: F104), and waits for a handset registration request (Step: F105).

Control section 27 of handset 2 waits for the radio link establishment confirmation from base unit 1 in Step: P105, and, upon receipt of the radio link establishment confirmation (Step: P105, Yes), controls radio communication section 21 so that the handset registration request including information on the handset ID assigned to each handset is transmitted (Step: P106). Thereafter, control section 27 waits for an authentication key generation request from base unit 1 (Step: P107).

Upon receipt of the handset registration request from handset 2 in Step: F105 (Step: F105, Yes), control section 18 of base unit 1 controls radio communication section 11 so as to transmit the authentication key generation request including the first numerical value (for example, in the case of the radio communication of the DECT system, a numerical value called "RAND") and the second numerical value (for example, in the case of the radio communication of the DECT system, a numerical value called "RS") to be used for handset authentication and authentication key generation (Step: F106). Thereafter, control section 18 waits for an authentication key generation response authentication request from handset 2 (Step: F107).

Upon receipt of the authentication key generation request from base unit 1 in Step: P107 (Step: P107, Yes), control section 27 of handset 2 generates the numerical value (for example, RES) for handset authentication to be transmitted by the authentication key generation response authentication request, on the basis of the first numerical value and the second numerical value notified by this authentication key generation request and the password input in Step: P103, and control section 27 further generates the random number value (for example, RAND for authentication) for authentication.

After generating an RES for authentication and RAND for authentication, control section 27 of handset 2 controls radio communication section 21 so that the authentication key generation response and authentication request including these numerical values to base unit 1 is transmitted (Step: P108). Thereafter, control section 27 waits for an authentication response from base unit 1 (Step: P109).

Upon receipt of the authentication key generation response and authentication request from handset 2 in Step: F107 (Step: F107, Yes), control section 18 of base unit 1 determines whether the numerical value for handset authentication, which is calculated from the password preregistered in base unit 1 and the first and second numerical values of the authentication key generation request transmitted in Step: F106, is equal to RES for handset authentication of the authentication key generation response authentication request received in Step: F107 (Step: F108). That is, in a case where it is equal to RES for handset authentication received from handset 2 (Step: F108, Yes), it is confirmed that the communication party is the correct handset. According to this, control section 18 of base unit 1 generates an authentication key (UAK) and the numerical value to be used to authenticate base unit 1 in handset 2, that is, RES for base unit authentication, using the password preregistered in base unit 1, the first and second numerical values of the authentication key generation request transmitted in Step: F106 and the numerical value to be used for base unit authentication of the authentication key generation response authentication request received in Step: F107.

Control section 18 of base unit 1 transmits the authentication response including RES for base unit authentication to handset 2 (Step: F109) and subsequently transmits the handset registration acceptance to handset 2 (Step: F111). Further, control section 18 stores the handset ID included in the handset registration request received in Step: F105 and the authentication key in information storage section 16 in association with each other (Step: F112), and waits for a radio link release indication (Step: F113).

Moreover, in a case where the received RES for handset authentication is not equal to the numerical value for handset authentication calculated by control section 18 of base unit 1 in Step: F108 (Step: F108, No), control section 18 of base unit 1 transmits handset registration acceptance rejection (Step: F110) and waits for the radio link release indication (Step: F113). Further, upon receipt of the radio link release (Step: F113, Yes), control section 18 finishes the handset registration sequence.

Upon receipt of the authentication response from base unit 1 in Step: P109 (Step: P109, Yes), control section 27 of handset 2 finds the numerical value for base unit authentication and an authentication key (UAK) by calculation on the basis of the password input in Step: P103, the first and second numerical values of the authentication key generation request received in Step: P107 and the numerical values which are used for base unit authentication and transmitted by the authentication key generation response authentication request in Step: P108 (Step: P110). Control section 27 compares the found numerical value for base unit authentication and RES for base unit authentication included in the authentication response received in Step: P109. In a case where both are equal (Step: P110, Yes), control section 27 waits for the handset registration acceptance that should be transmitted from base unit 1 (Step: P111).

Thereafter, upon receipt of the handset registration acceptance (Step: P111, Yes), control section 27 of handset 2 stores the base unit ID received in Step: P102 and the authentication key (UAK) found in Step: P110 in information storage section 26 (Step: P112), transmits the radio link release (Step: P113) and finishes the handset registration sequence.

Moreover, in a case where it is determined in Step: P110 that RES for base unit authentication included in the authentication response received in Step: P109 is not correct (Step: P110, No), control section 27 of handset 2 transmits the radio link release to base unit 1 (Step: P113) and finishes the handset registration sequence.

Next, the timing of initial encryption key generation and an operation example of position registration of a cordless telephone, which are feature points of the present application, are described. The position registration is performed when handset 2 starts operation in a coverage area of base unit 1 after the above-mentioned handset registration completion and at the time of power activation of handset 2 in radio communication performed to acquire the initial encryption key, the extension number and various kinds of base unit information, for example. For example, in radio communication of the DECT system, the sequence of the position registration is called "Access rights procedure."

Here, the initial encryption key is an encryption key generated using the above-mentioned authentication key. The present invention has a feature in the technique to surely generate this initial encryption key and suppress the number of times of encryption key generation.

Figure 6:
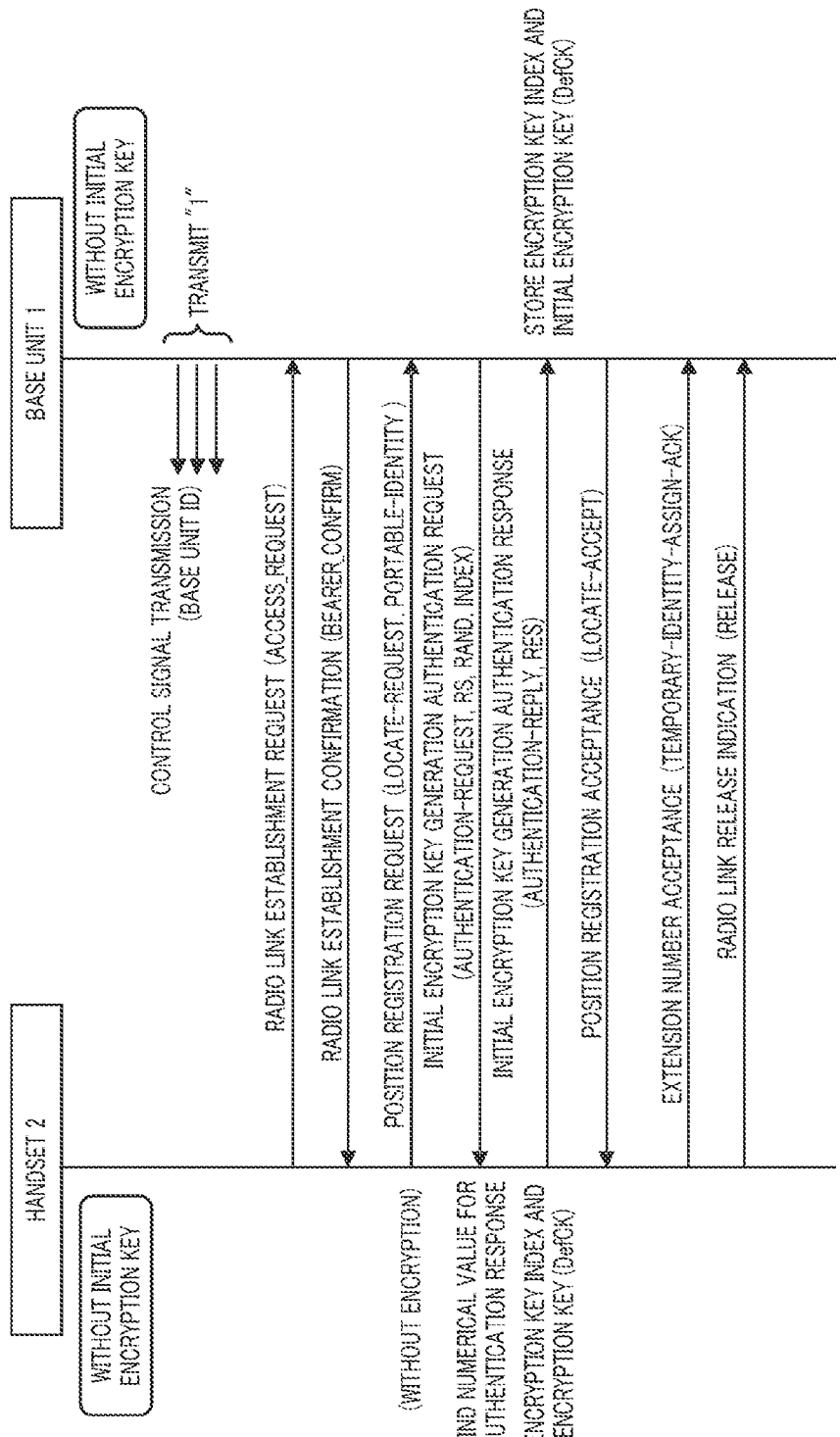
FIG. 6 shows a diagram illustrating an example of signals to be transmitted and received by radio communication for position registration of a base unit and a handset before the initial encryption key is assigned, according to Embodiment 1 of the present invention.

FIG. 6 shows a diagram illustrating an example of signals to be transmitted and received by radio communication for position registration between base unit 1 and handset 2 before the initial encryption key is assigned. The radio communication in the position registration by base unit 1 and handset 2 before the initial encryption key is assigned is performed without encryption. Further, FIG. 6 illustrates an operation example of assigning the initial encryption key (for example, in the case of the radio communication of the DECT system, the initial encryption key is called "Default Cipher Key" (which is referred to as "DefCK" below)) during the position registration sequence.

In the case of performing position registration as illustrated in FIG. 6, first, handset 2 transmits a radio link establishment request message (for example, in the case of the radio communication of the DECT system, "access_request" that is a message for the control of the MAC layer) to request the start of radio communication. Upon receipt of the radio link establishment request, base unit 1 transmits a radio link establishment confirmation message (for example, in the case of the radio communication of the DECT system, "bearer_confirm" that is a message for the control of the MAC layer) and activates a radio communication channel between base unit 1 and handset 2.

Next, handset 2 transmits a position registration request to request the position registration without encryption because the initial encryption key is not assigned. For example, in the case of the radio communication of the DECT system, this position registration request is called {LOCATE-REQUEST} that is a message of the NWK layer. By this position registration request, information including the handset ID stored in information storage section 26 is transmitted. In the case of the radio communication of the DECT system, this information including the handset ID is called "<<PORTABLE-IDENTITY>> Identity value" of the NWK layer.

Upon receipt of the position registration request without activation of encrypted communication, base unit 1 realizes that handset 2 has no encryption key, and transmits an initial encryption key generation authentication request (AUTHENTICATION-REQUEST, RS, RAND, index). The initial encryption key generation authentication request is a message for handset authentication to determine whether the other party is a valid handset, and includes two numerical values to be used in calculation for the handset authentication. Moreover, the initial encryption key generation authentication request is a message to generate the initial encryption key, and includes an index to specify the initial encryption key required at the time of activating encrypted communication using the initial encryption key.

In the case of the radio communication of the DECT system, the initial encryption key generation authentication request is {AUTHENTICATION-REQUEST}, which is a message of the NWK layer, DEF of an information element called <<AUTH-TYPE>> to indicate an instruction for initial encryption key generation is set to "1," and an index to specify the initial encryption key is indicated by Default Cipher Key Index. Moreover, two numerical values to be used for handset authentication are called "RAND" and "RS."

Upon receipt of this initial encryption key generation authentication request, handset 2 extracts the index, generates the initial encryption key and the RES for handset authentication by calculation based on information on the above-mentioned RS, RAND and authentication key (UAK), and stores these initial encryption key and index. This point is described later in detail. Moreover, handset 2 transmits an initial encryption key generation authentication response (AUTHENTICATION-REPLY, RES) including the RES for handset authentication and information indicating that the initial encryption key is generated, to base unit 1. This initial encryption key generation authentication response is a message to indicate RES to confirm whether handset 2 generates a correct encryption key.

In the following, a detailed explanation is given to the point that handset 2 generates and stores the initial encryption key. In handset 2, the initial encryption key is found by predefined calculation using two numerical values for initial encryption key generation and/or handset authentication included in the initial encryption key generation authentication request (in the case of the DECT system, RS and RAND) and the authentication key (UAK) stored in information storage section 26 at the time of handset registration described above. Moreover, the RES for handset authentication is found by calculation based on these RS, RAND and authentication key (UAK).

Further, control section 27 of handset 2 stores the found initial encryption key and the index indicated by the initial encryption key generation authentication request from base unit 1, in information storage section 26. Subsequently, control section 27 of handset 2 transmits an initial encryption key generation authentication response showing that the initial encryption key is generated, to base unit 1 together with the above-mentioned RES for handset authentication. In the case of the radio communication of the DECT system, the initial encryption key generation authentication response is {AUTHENTICATION-REPLY} that is a message of the NWK layer.

Here, after transmitting the above-mentioned initial encryption key generation authentication request to handset 2, base unit 1 generates the initial encryption key and the value for authentication by calculation based on information on the same RS, RAND and authentication key (UAK) even in base unit 1.

Upon receipt of the initial encryption key generation authentication response including the RES (AUTHENTICATION-REPLY, RES) which is transmitted from handset 2, base unit 1 examines whether the RES for handset authentication is correct, recognizes that handset 2 has the same encryption key in a case where it is correct, and transmits position registration acceptance to handset 2. This position registration acceptance is a message to indicate that the position registration is correctly completed, and indicates the latest extension number to handset 2 together with this message.

The determination as to whether the RES for handset authentication is correct is made by comparing the RES for handset authentication notified by the initial encryption key generation authentication response from handset 2 and the calculation result using two numerical values transmitted by the initial encryption key generation authentication request and the authentication key UAK stored in information storage section 16. In a case where both are equal, control section 18 of base unit 1 determines that the communication party having transmitted the position registration request is a valid handset, and transmits the position registration acceptance.

Moreover, in a case where the RES for handset authentication is correct, control section 18 of base unit 1 finds the initial encryption key using two numerical values for initial encryption key generation and/or handset authentication transmitted by the initial encryption key generation authentication request (in the case of the DECT system, RS and RAND) and the authentication key stored in information storage section 16 at the time of the handset registration described above (in the case of the DECT system, UAK). Further, control section 18 of base unit 1 associates and stores the found initial encryption key and the index indicated by the initial encryption key generation authentication request in information storage section 16. In the case of the radio communication of the DECT system, the position registration acceptance is called {LOCATE-ACCEPT} that is a message of the NWK layer.

Upon receipt of the position registration acceptance, handset 2 transmits a message of extension number acceptance, transmits a radio link release indication next, stops the transmission and completes the position registration sequence. The extension number acceptance is a message to indicate that the extension number indicated by the position registration acceptance is accepted. Moreover, the radio link release indication is a message to indicate that the transmission and reception is stopped and communication is terminated. In the case of the radio communication of the DECT system, the extension number acceptance is {TEMPORARY-IDEN- TITY-ASSIGN-ACK} that is a message of the NWK layer, and the radio link release indication is called "release" that is a message of the MAC layer.

As described above, the position registration by base unit 1 and handset 2 before the initial encryption key is assigned is completed, the initial encryption key and the index are stored in handset 2 and base unit 1. The position registration to perform the initial encryption key assignment illustrated in FIG. 6 is normally performed at the time of the first position registration after the handset registration, and in subsequent position registration, position registration by encrypted communication using the initial encryption key, which is described later, is performed. At the time of this first position registration, handset 2 and base unit 1 write both an encryption key index and an initial encryption key (DefCK) in an information storage section that is a nonvolatile memory such as an EEPROM.

Figure 7:
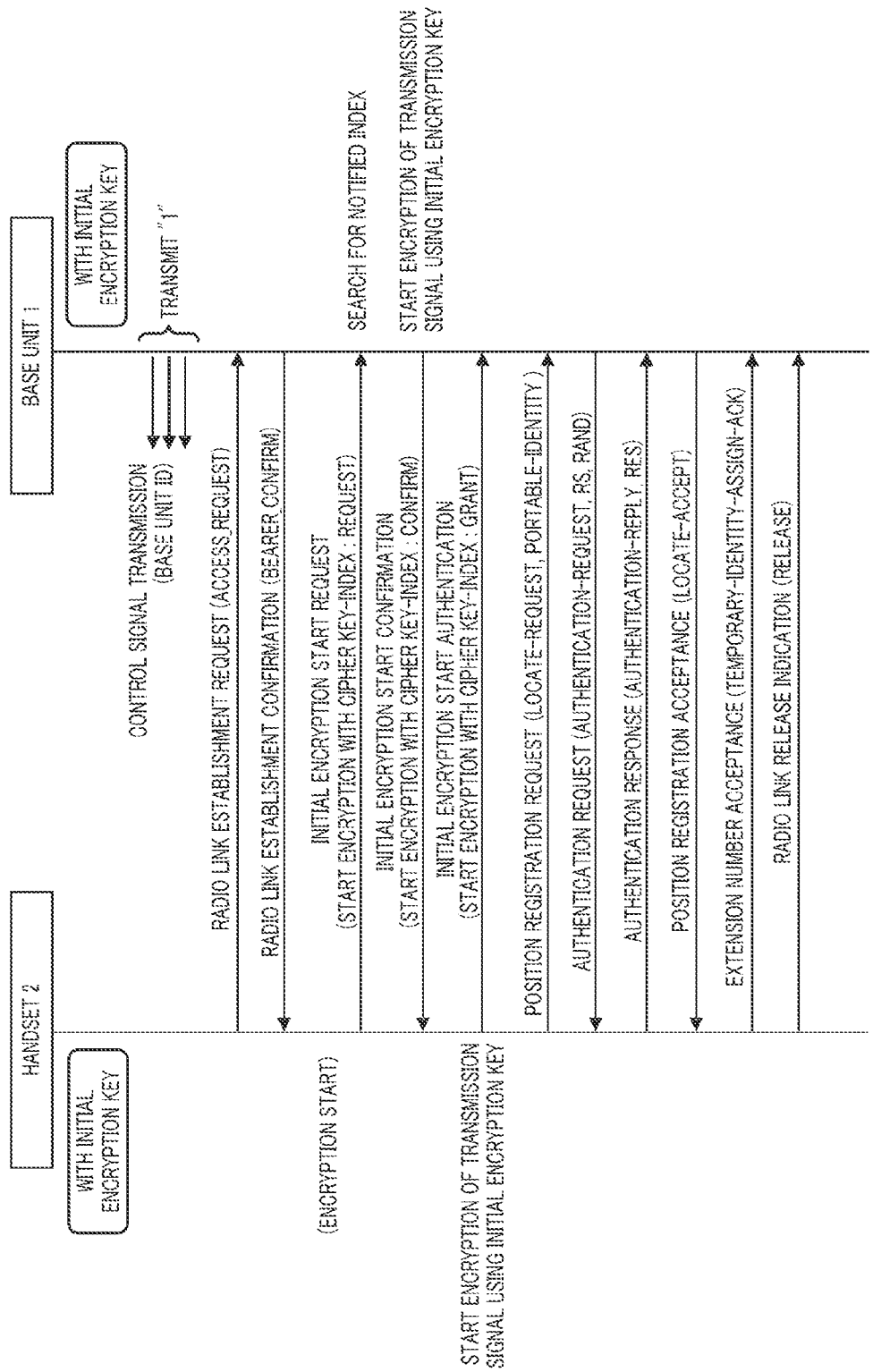
FIG. 7 shows a diagram illustrating an example of signals to be transmitted and received by radio communication for position registration of a base unit and a handset to which the initial encryption key has been assigned, according to Embodiment 1 of the present invention.

Next, an operation example is described in a case where, in a cordless telephone using the radio communication apparatus of the present invention described above, a handset to which the initial encryption key has been assigned after the completion of the first position registration is disconnected from base unit 1 for some reasons and subsequently performs position registration again. FIG. 7 shows a diagram illustrating an example of radio communication for position registration performed between base unit 1 and handset 2 to which the initial encryption key has been assigned. In the radio communication in the position registration by base unit 1 and handset 2 to which the initial encryption key has been assigned, communication encrypted using the initial encryption key immediately after the activation completion of a radio link is activated. Messages associated with subsequent position registration are transmitted and received by the encrypted communication.

In the case of performing position registration again as illustrated in FIG. 7, operation until radio link establishment, in which handset 2 transmits a radio link establishment request and base unit 1 transmits a message for radio link establishment confirmation, is similar to the above-mentioned position registration in FIG. 6.

After the radio link is established, control to activate encrypted communication using the initial encryption key is started. To activate the encrypted communication using the initial encryption key, first, handset 2 transmits an initial encryption start request. This initial encryption start request is a message to activate the encrypted communication using the initial encryption key and is indicated by the above-mentioned initial encryption key generation authentication request (FIG. 6) from base unit 1, and an index to specify the initial encryption key stored in information storage section 26 is transmitted to base unit 1 together with the initial encryption start request. Further, after transmitting the initial encryption start request, control section 27 of handset 2 controls radio communication section 21 so as to decrypt the received signal using the initial encryption key stored in information storage section 26. In the case of the radio communication of the DECT system, the initial encryption start request is called "start encryption with cipher key-index: request," which is a message of the MAC layer.

On the other hand, upon receipt of the initial encryption start request, control section 18 of base unit 1 transmits an initial encryption start confirmation to handset 2 in a case where the same index is stored in information storage section 16. This initial encryption start confirmation is a message to indicate the acceptance of the initial encryption start request and the start of encryption transmission. That is, upon receipt of the initial encryption start request from handset 2, control section 18 of base unit 1 searches information storage section 16, examines whether the one equal to the index indicated by the initial encryption start request from handset 2 is stored, accepts the initial encryption start request in a case where the equal one is stored, and transmits an initial encryption start confirmation.

Further, control section 18 of base unit 1 controls radio communication section 11 so as to encrypt the transmission signal using the initial encryption key stored in pair with the index notified by the initial encryption start request which is stored in information storage section 16. In the case of the radio communication of the DECT system, the initial encryption start confirmation is called "start encryption with cipher key-index: confirm," which is a message of the MAC layer.

Upon receipt of the initial encryption start confirmation, control section 27 of handset 2 transmits an initial encryption start approval. This initial encryption start approval is a message to indicate the acceptance of the initial encryption start confirmation and the start of encryption transmission. After transmitting the initial encryption start approval, handset 2 controls radio communication section 21 so as to encrypt subsequent transmission signals using the initial encryption key stored in information storage section 26. In the case of the radio communication of the DECT system, the initial encryption start approval is called "start encryption with cipher key-index: grant," which is a message of the MAC layer.

Upon receipt of the initial encryption start approval, control section 18 of base unit 1 controls radio communication section 11 so as to decrypt the received signal using the initial encryption key stored in pair with the index indicated by the initial encryption start request stored in information storage section 16.

As described above, when the activation of the encrypted communication using the initial encryption key is completed, thereafter, messages for control and speech data which are communicated between base unit 1 and handset 2 are encrypted using the initial encryption key, except for messages related to the maintenance/release of a radio link such as a radio link release indication to indicate the disconnection of the radio communication.

When the activation of the encrypted communication using the initial encryption key is completed, handset 2 transmits a position registration request. The position registration request is the same as the position registration request in the above-mentioned position registration in FIG. 6, except for that the message is encrypted by the initial encryption key.

Upon receipt of the position registration request after the activation of encrypted communication by the initial encryption key is completed, base unit 1 transmits an authentication request. The authentication request is a message for handset authentication to determine whether the other party is valid handset 2, and includes two numerical values to be used in calculation for handset authentication. In the case of the radio communication of the DECT system, the initial encryption key generation authentication request is {AUTHENTICATION-REQUEST}, which is a message of the NWK layer, and two numerical values to be used for the calculation for handset authentication are called "RAND" and "RS."

Upon receipt of the authentication request, handset 2 transmits an authentication response to base unit 1. The authentication response is a message to indicate an RES for handset authentication. Similar to the above, the RES for handset authentication is found by predefined calculation using two numerical values (in the case of the DECT system, RS and RAND) for handset authentication included in the authentication request and the user authentication key (in the case of the DECT system, UAK) stored in information storage section 26 at the time of the above-mentioned handset registration.

Upon receipt of the authentication response, base unit 1 determines whether the RES for handset authentication is correct, and transmits a position registration acceptance to handset 2 in a case where the RES for handset authentication is correct. This position registration acceptance is a message to indicate that the position registration is correctly completed, and the latest extension number of the handset is indicated by this message. Similar to the above, the determination as to whether the RES for handset authentication is correct is made by comparing the RES for handset authentication indicated by the initial encryption key generation authentication response and the calculation result in base unit 1 using two numerical values transmitted by the authentication request and the authentication key stored in information storage section 16. When both are equal, control section 18 of base unit 1 determines that the other party having transmitted the position registration request is a valid handset, and transmits a position registration acceptance. In the case of the radio communication of the DECT system, the position registration acceptance is called {LOCATE-ACCEPT}, which is a message of the NWK layer.

Thereafter, similar to the above-mentioned position registration in FIG. 6, upon receipt of the position registration acceptance, handset 2 transmits an extension number acceptance message, transmits a radio link release indication next, stops the transmission and completes the position registration sequence.

Next, a description is given of a position registration sequence in which the base unit rejects encrypted communication using the initial encryption key. This sequence is activated in a case where the handset holds the initial encryption key and an index and the base unit does not hold the corresponding initial encryption key and index. For example, in the above-mentioned sequence in FIG. 6, if some troubles such as a power failure occur when the base unit saves the initial encryption key and the index, there is a case where the base unit cannot saves the initial encryption key and the index correctly. In such a case, the position registration sequence in which the base unit rejects encrypted communication using the initial encryption key is activated.

Figure 8:
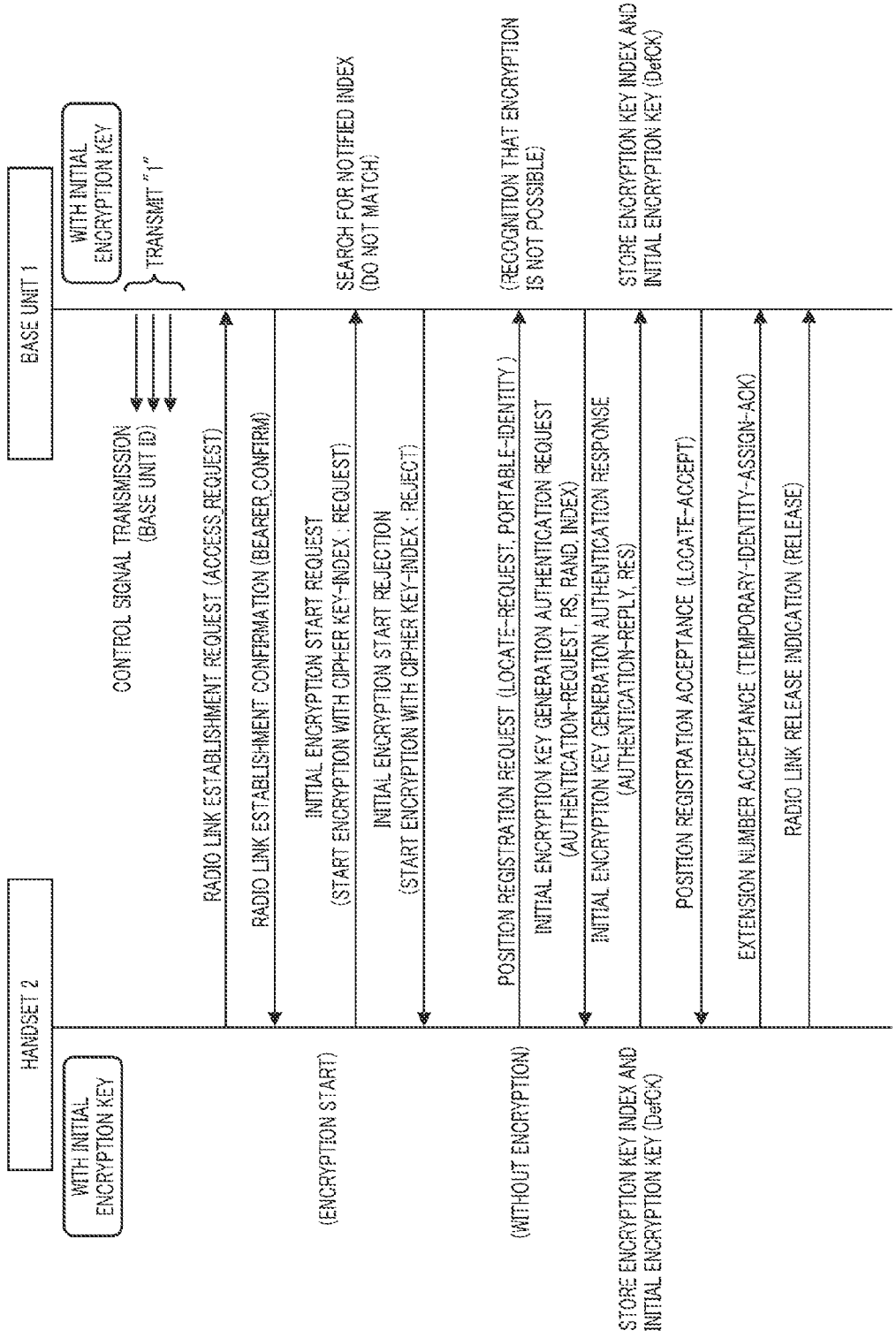
FIG. 8 shows a diagram illustrating an example of signals to be transmitted and received by radio communication for position registration of a base unit and a handset in a case where encrypted communication using the initial encryption key is rejected, according to Embodiment 1 of the present invention.

FIG. 8 shows a diagram illustrating an example of signals to be transmitted and received by radio communication when encrypted communication by the initial encryption key from handset 2 is rejected by base unit 1 and position registration is performed without encryption.

As illustrated in FIG. 8, operation until radio link establishment, in which handset 2 transmits a radio link establishment request and base unit 1 transmits a message for radio link establishment confirmation, is similar to the above-mentioned position registration in FIG. 6 and FIG. 7. Further, operation that handset 2 transmits an initial encryption start request after the radio link is established is similar to the above-mentioned operation to transmit the initial encryption start request at the time of the position registration in FIG. 7.

Upon receipt of the initial encryption start request, similar to the explanation at the time of the position registration in FIG. 7, control section 18 of base unit 1 searches information storage section 16. Further, in a case where the one equal to the index indicated by the initial encryption start request is not stored (mismatch), as illustrated in FIG. 8, base unit 1 transmits an initial encryption start rejection to handset 2 in order to reject the initial encryption start request.

Upon receipt of the initial encryption start rejection, control section 27 of handset 2 stops the decryption with the initial encryption key and controls radio communication section 21 so as to perform communication without encryption thereafter.

As illustrated in FIG. 8, upon receipt of the initial encryption start rejection, control section 27 of handset 2 transmits a position registration request to base unit 1 without encryption. When the position registration request is transmitted to base unit 1 without encryption, base unit 1 realizes that handset 2 does not have a right encryption key, and transmits an initial encryption key generation authentication request (AUTHENTICATION-REQUEST, RS, RAND, Index) similar to the case of FIG. 6. This generation authentication request is a message for handset authentication to determine whether the other party is a valid handset, includes two numerical values (RS, RAND) to be used for authentication calculation and further includes an index to specify the initial encryption key. Thereafter, the sequence of initial encryption key generation and position registration is advanced between handset 2 and base unit 1, and the initial encryption key and the index are stored in information storage section 26 of handset 2 and information storage section 16 of base unit 1. Here, since operation from the transmission of the position registration request in handset 2 to the transmission of the radio link release indication is the same as the position registration operation illustrated in FIG. 6, the explanation is omitted.

Figure 9A:
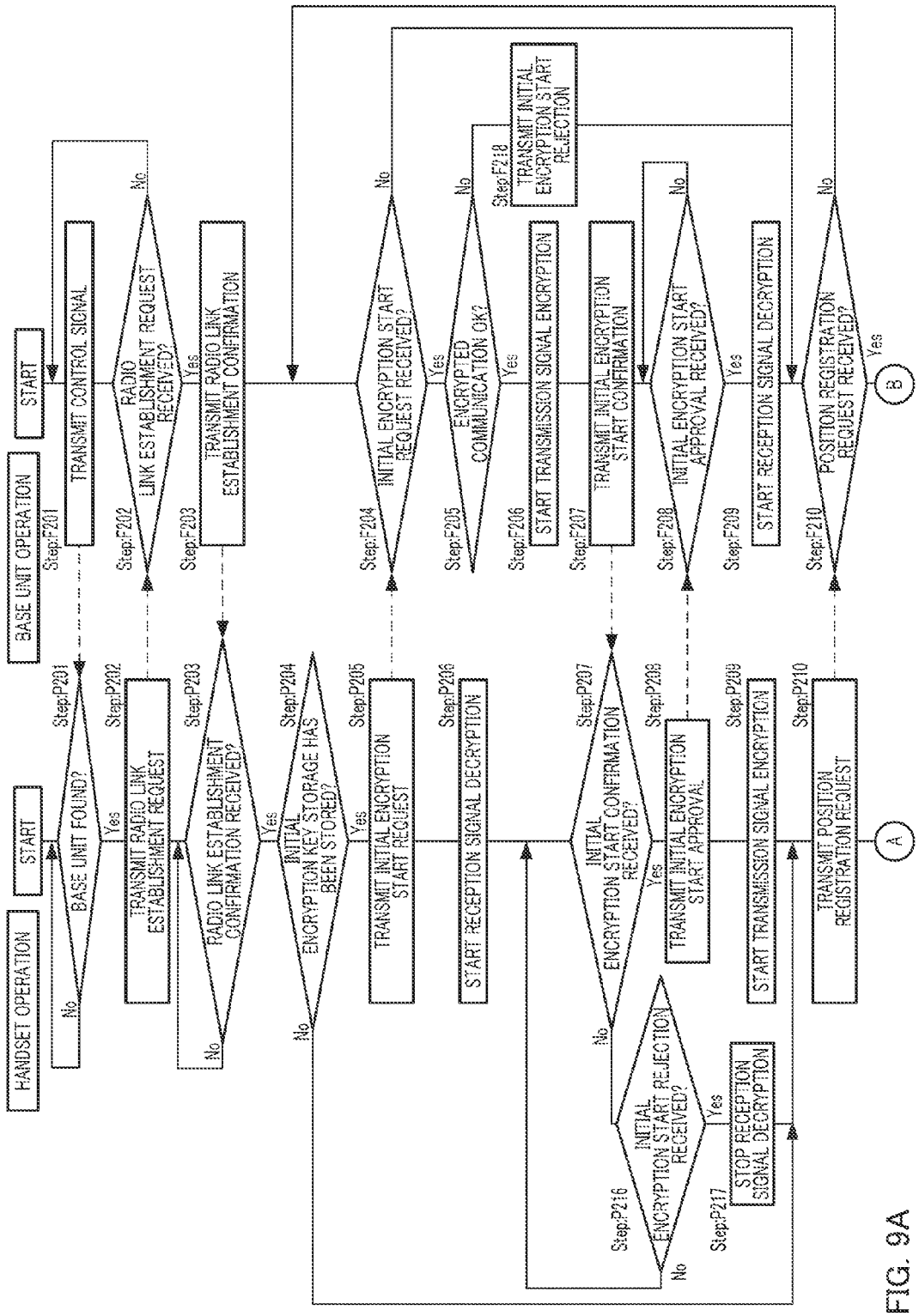
FIG. 9A shows a flowchart illustrating an example of operation of a base unit and a handset at the time of position registration and initial encryption key assignment, according to Embodiment 1 of the present invention.
Figure 9B:
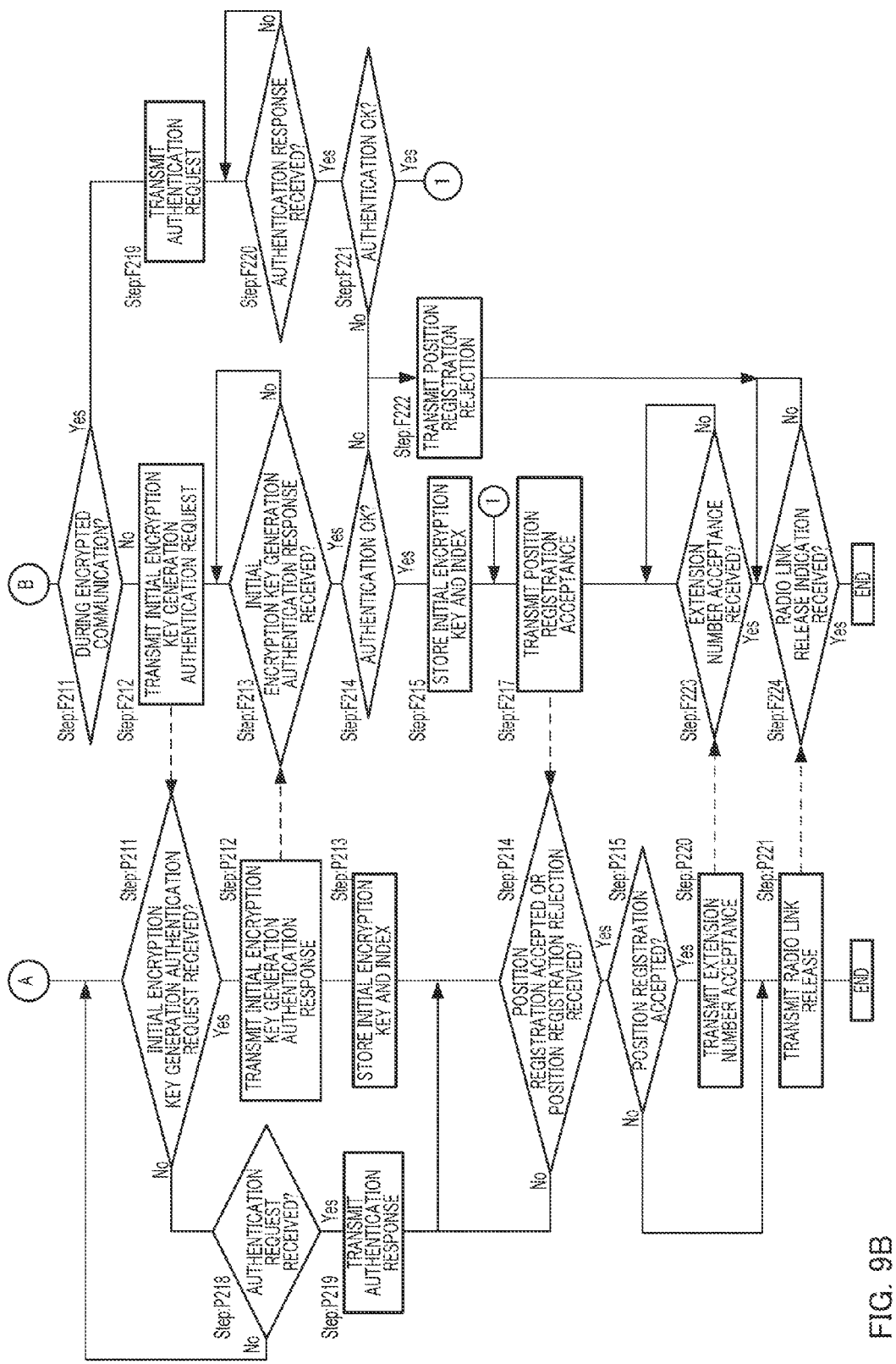
FIG. 9B shows a flowchart illustrating an example of operation of a base unit and a handset at the time of position registration and initial encryption key assignment, according to Embodiment 1 of the present invention.

Next, the position registration operation is described using FIG. 9A and FIG. 9B. FIG. 9A and FIG. 9B show flowcharts illustrating an example of operation of base unit 1 and handset 2 at the time of the position registration. First, an explanation is given to an operation example case of the position registration by the encrypted communication illustrated in FIG. 7.

Handset 2 enters a state to find a control signal of base unit 1 immediately after power-on or in a state where handset 2 cannot receive a base unit control signal (Step: P201). In Step: P201, control section 27 of handset 2 makes radio communication section 21 enter a reception state, and searches for base unit 1 of the same base unit ID as the base unit ID stored in information storage section 26.

Control section 18 of base unit 1 transmits the control signal including the base unit ID in a normal state after the power-on (Step: F201), and controls radio communication section 11 to receive a radio link establishment request from handset 2 (Step: F202).

Upon receipt of the control signal including the base unit ID from base unit 1, control section 27 of handset 2 compares the base unit ID with the registered base unit ID stored in information storage section 26. When the received base unit ID and the base unit ID stored in information storage section 26 match each other (Step: P201, Yes), control section 27 transmits a radio link establishment request, controls radio communication section 21 so as to receive a radio link establishment confirmation from base unit 1 (Step: P202), and waits for the radio link establishment confirmation (Step: P203).

Upon receipt of the radio link establishment request from handset 2 in Step: F202 (Step: F202, Yes), control section 18 of base unit 1 controls radio communication section 11 so as to transmit the radio link establishment confirmation (Step: F203), and waits for an initial encryption start request (Step: F204).

Control section 27 of handset 2 waits for the radio link establishment confirmation from base unit 1, and upon receipt of the radio link establishment confirmation in Step: P203 (Step: P203, Yes), determines whether the initial encryption key has been stored (Step: P204). That is, control section 27 searches information storage section 26 and examines whether an index and the initial encryption key are stored in Step: P204, and in a case where the index and the initial encryption key are stored (Step: P204, Yes), transmits an initial encryption start request including the index (Step: P205). Further, control section 27 controls radio communication section 21 so as to decrypt the received signal by the initial encryption key stored in information storage section 26 (Step: P206), and waits for an initial encryption start confirmation (Step: P207).

Upon receipt of the initial encryption start request from handset 2 in Step: F204 (Step: F204, Yes), control section 18 of base unit 1 determines whether encrypted communication is possible (Step: F205). That is, in Step: F205, control section 18 searches information storage section 16 and examines whether the index specified by the received initial encryption start request is stored in information storage section 16. In a case where the index is stored (Step: F205, Yes), control section 18 controls radio communication section 11 so as to encrypt a transmission signal by the initial encryption key stored in pair with the index (Step: F206), and transmits the initial encryption start confirmation (Step: F207).

Control section 27 of handset 2 waits for the initial encryption start confirmation from base unit 1 in Step: P207, upon receipt of the initial encryption start confirmation (Step: P207, Yes), transmits an initial encryption start approval (Step: P208), controls radio communication section 21 so as to encrypt the transmission signal by the initial encryption key stored in pair with the index (Step: P209), and completes the activation of encrypted communication by the initial encryption key.

After transmitting the initial encryption start confirmation (Step: F207), control section 18 of base unit 1 waits for the initial encryption start approval (Step: F208). Upon receipt of the initial encryption start approval in Step: F208 (Step: F208, Yes), control section 18 controls radio communication section 11 so as to decrypt the received signal by the initial encryption key stored in pair with the index received in Step: F204 (Step: F209), and completes the activation of the encrypted communication by the initial encryption key.

When the activation of the encrypted communication by the initial encryption key is completed in Step: P209, control section 27 of handset 2 reads out its own handset ID from information storage section 26 and transmits a position registration request including information on the handset ID (Step: P210).

When the activation of the encrypted communication by the initial encryption key is completed in Step: F209, control section 18 of base unit 1 waits for the position registration request (Step: F210). Upon receipt of the position registration request (Step: F210, Yes), control section 18 determines whether the activation of the encrypted communication is completed in the radio link in which the position registration is received (Step: F211). If the encrypted communication is being performed (Step: F211, Yes), control section 18 generates two numerical values for handset authentication and transmits an authentication request including two numerical values for handset authentication (Step: F219).

After transmitting the position registration request (Step: P210), control section 27 of handset 2 waits for an initial encryption generation authentication request (Step: P211). When receiving a message other than the initial encryption generation authentication request in Step: P211 (Step: P211, No), control section 27 waits for the authentication request (Step: P218). In a case where the received message is the initial encryption generation authentication request from base unit 1 in Step: P218 (Step: P218, Yes), control section 27 finds an RES for handset authentication on the basis of authentication key UAK stored in information storage section 26 and two numerical values indicated by the authentication request, and transmits an authentication response including the RES for handset authentication to base unit 1 (Step: P219).

After transmitting the authentication request (Step: F219), control section 18 of base unit 1 waits for the authentication response (Step: F220). Upon receipt of the authentication response from handset 2 (Step: F220, Yes), control section 18 finds a numerical value for authentication from the authentication key stored in information storage section 16 and two numerical values transmitted by the authentication request, and compares it with the RES for handset authentication indicated from handset 2 by the authentication response (Step: F221). In a case where both are equal (Step: F220, Yes), control section 18 determines the extension number of handset 2 and transmits a position registration acceptance including information on the extension number of handset 2 (Step: F217). Further, base unit 1 waits for the extension number acceptance from handset 2 (Step: F223), and, upon receipt of the extension number acceptance (Step: F223, Yes), waits for a radio link release indication (Step: F224). When the radio link release indication is received (Step: F224, Yes), the control of the position registration with handset 2 is terminated.

Here, in a case where the RES for handset authentication indicated by the authentication response and the numerical value found from the authentication key stored in information storage section 16 and two numerical values transmitted by the authentication request are not equal in Step: F221 (Step: F221, No), control section 18 of base unit 1 transmits a position registration acceptance rejection (Step: F222) and waits for the radio link release indication (Step: F224), and the position registration control is terminated in the same way as above.

After transmitting the authentication response (Step: P219), control section 27 of handset 2 waits for the position registration acceptance or a position registration rejection (Step: P214). Further, when the position registration acceptance or the position registration rejection is received (Step: P214, Yes), it is determined whether the received message is the position registration acceptance (Step: P215). In a case where the received message is the position registration acceptance in Step: P215 (Step: P215, Yes), the extension number acceptance is transmitted (Step: P220), the radio link release is transmitted (Step: P221) and the control of the position registration with base unit 1 is terminated. Moreover, in a case where the received message is not the position registration acceptance in Step: P215 (Step: P215, No), the radio link release is transmitted (Step: P221) and the control of the position registration with base unit 1 is terminated.

Next, using FIG. 9A and FIG. 9B, an operation example is described where the initial encryption key is assigned in position registration when the assignment of the initial encryption key illustrated in FIG. 6 is not completed. Here, in this case, operation up to the radio link establishment between base unit 1 and handset 2, that is, operation up to Step: P203 of handset 2 and Step: F203 of base unit 1 is the same as the case of the operation example of the position registration by the encrypted communication described above, so that the explanation is omitted.

In a case where the assignment of the initial encryption key is not completed, since the index and the initial encryption key are not stored in Step: P204 to determine whether the initial encryption key has been stored, it proceeds to "No" in Step: P204, and a position registration request is transmitted without activating encrypted communication. That is, control section 27 of handset 2 reads out its own handset ID from information storage section 26 and transmits a position registration request including information on the handset ID (Step: P210).

In the case of not receiving an initial encryption start request from handset 2 in Step: F204, control section 18 of base unit 1 proceeds to "No" in Step: F204 and waits for position registration in Step: F210. Upon receipt of a position registration request in Step: F210 (Step: F210, Yes), control section 18 of base unit 1 determines whether the activation of the encrypted communication is completed in a radio link in which the position registration is received (Step: F211). In a case where the encrypted communication is not activated (Step: F211, No), control section 18 generates two numerical values to be used for initial encryption key generation and handset authentication, and transmits an initial encryption key generation authentication request including two numerical values to be used for initial encryption key generation and handset authentication (Step: F212).

After transmitting the position registration request (Step: P210), control section 27 of handset 2 waits for the initial encryption key generation authentication request (Step: P211). Upon receipt of a message of the initial encryption key generation authentication request in Step: P211 (Step: P211, Yes), control section 27 of handset 2 finds a numerical value to be used for handset authentication from the authentication key stored in information storage section 26 and two numerical values indicated by the initial encryption key generation authentication request, and transmits an initial encryption key generation authentication response including the numerical value to be used for handset authentication (Step: P212). Further, control section 27 of handset 2 finds the initial encryption key from the authentication key stored in information storage section 26 and two numerical values indicated by the initial encryption key generation authentication request, and stores it in information storage section 26 together with the index indicated by the initial encryption key generation authentication request (Step: P213).

After transmitting the initial encryption key generation authentication request (Step: F212), control section 18 of base unit 1 waits for the initial encryption key generation authentication response (Step: F213). Upon receipt of the initial encryption key generation authentication response (Step: F213, Yes), control section 18 finds a numerical value for authentication from the authentication key stored in information storage section 16 and two numerical values transmitted by the initial encryption key generation authentication request, and compares the value with the RES for handset authentication indicated from handset 2 by the initial encryption key generation authentication response (Step: F214). In a case where both are equal (Step: F214, Yes), control section 18 finds the initial encryption key from the authentication key stored in information storage section 16 and two numerical values indicated by the initial encryption key generation authentication request, and stores the initial encryption key in information storage section 26 together with the index indicated by the initial encryption key generation authentication request (Step: F215).

Further, control section 18 of base unit 1 determines the extension number of handset 2 and transmits a position registration acceptance including information on the extension number of handset 2 (Step: F217). Further, control section 18 of base unit 1 waits for an extension number acceptance (Step: F223), and, upon receipt of the extension number acceptance (Step: F223, Yes), waits for a radio link release indication (Step: F224). Upon receipt of the radio link release indication (Step: F224, Yes), the control of the position registration with handset 2 is terminated.

Here, in a case where the RES for handset authentication indicated from handset 2 by the initial encryption key generation authentication response and the numerical value found from the authentication key stored in information storage section 16 and two numerical values transmitted by the initial encryption key generation authentication request are not equal in Step: F214 (Step: F214, No), control section 18 of base unit 1 transmits a position registration acceptance rejection (Step: F222) and waits for a radio link release indication (Step: F224), and the position registration control is terminated in the same way as above.

After storing the initial encryption key and the index (Step: P213), control section 27 of handset 2 waits for a position registration acceptance or a position registration rejection (Step: P214). Further, upon receipt of the position registration acceptance or the position registration rejection transmitted from base unit 1 (Step: P214, Yes), control section 27 determines whether the received message is the position registration acceptance (Step: P215). In a case where the message received from base unit 1 is the position registration acceptance in Step: P215 (Step: P215, Yes), control section 27 transmits the extension number acceptance (Step: P220), transmits the radio link release (Step: P221), and terminates the control of the position registration with base unit 1.

Moreover, in a case where the message received from base unit 1 is the position registration rejection in Step: P215 (Step: P215, No), control section 27 of handset 2 does not transmit the extension number acceptance and transmits the radio link release (Step: P221).

Next, using FIG. 9A and FIG. 9B, an operation example is described where the base unit rejects a request of encrypted communication by the initial encryption key illustrated in FIG. 8 and the initial encryption key is assigned in position registration. Here, in this case, operation from the radio link establishment between base unit 1 and handset 2 to the transmission and reception of the initial encryption start request, that is, operation up to Step: P206 of handset 2 and Step: F204 of base unit 1 is the same as the case of the operation example of the position registration by the encrypted communication described above, so that the explanation is omitted.

Upon receipt of an initial encryption start request from handset 2 (Step: F204, Yes), control section 18 of base unit 1 determines whether encrypted communication is possible (Step: F205). That is, in Step: F205, control section 18 of base unit 1 searches information storage section 16 and examines whether an index specified by the received initial encryption start request is stored in information storage section 16. In a case where the index is not stored (Step: F205, No), control section 18 transmits an initial encryption start rejection to reject the activation of encrypted communication using the initial encryption key (Step: F218).

Control section 27 of handset 2 waits for an initial encryption start confirmation from base unit 1 in Step: P207, and, in a case where Control section 27 of handset 2 cannot receive the initial encryption start confirmation (Step: P207, No), waits for an initial encryption start rejection (Step: P216). Further, upon receipt of the initial encryption start rejection in Step: P216, control section 27 of handset 2 controls radio communication section 11 so as to receive an unencrypted signal without performing decryption processing (Step: P217), and transmits a position registration request without encryption (Step: P210). The operation of handset 2 after Step: P210 with operation, in which base unit 1 rejects a request of encrypted communication by the initial encryption key illustrated in FIG. 8 and assigns the initial encryption key in position registration, is the same as the above-mentioned operation example of assigning the initial encryption key in position registration in a case where the assignment of the initial encryption key is not completed, so that the explanation is omitted.

After transmitting the initial encryption start rejection (Step: F218), control section 18 of base unit 1 waits for a position registration request (Step: F210). The operation of base unit 1 after Step: F210 with operation, in which base unit 1 rejects a request of encrypted communication by the initial encryption key illustrated in FIG. 8 and assigns the initial encryption key in position registration, is the same as the above-mentioned operation example of assigning the initial encryption key in position registration in a case where the assignment of the initial encryption key is not completed, so that the explanation is omitted.

According to such operation in FIG. 6, FIG. 7, FIG. 8, FIG. 9A and FIG. 9B, in a case where base unit 1 and handset 2 have the initial encryption key, it is possible to perform position registration by communication encrypted using the initial encryption key, and in a case where base unit 1 does not have the initial encryption key, it is possible to generate the initial encryption key during the position registration. Therefore, in a case where the generation and storage of the initial encryption key are correctly operated, since the initial encryption key is not generated thereafter, operation to write relevant information on the initial encryption key and an index or the like in a nonvolatile memory such as an EEPROM is performed only once. Although the number of rewritable times is limited in the nonvolatile memory such as the EEPROM in general, according to the present invention, it is possible to avoid the risk that the number rewritable times of the nonvolatile memory such as the EEPROM exceeds the maximum number of rewritable times because of the writing of related information on the initial encryption key and the index, for example.

When the generation and storage of the initial encryption key are correctly operated, the sequence to generate the initial encryption key is performed only once, which brings about an advantage of a lower risk of the sequence being wiretapped and a lower risk of the method for generating the initial encryption key or the initial encryption key itself being found out by a third party. Moreover, even in a case where one or both of the base unit and the handset cannot correctly store the related information on the initial encryption key and the index or the like such as a case where the handset runs out of battery during the generation and storage of the initial encryption key or a case where a power failure occurs in the base unit, it is possible to generate and store the initial encryption key again at the chance of the next position registration. That is, even in a case where the generation and storage of the initial encryption key abnormally terminate, recovery processing such as registration of the handset again does not have to be performed, which in turns, enhances the convenience.

The position registration operation in the cordless telephone using the radio communication apparatus of the present invention has been described thus far.

Figure 10:
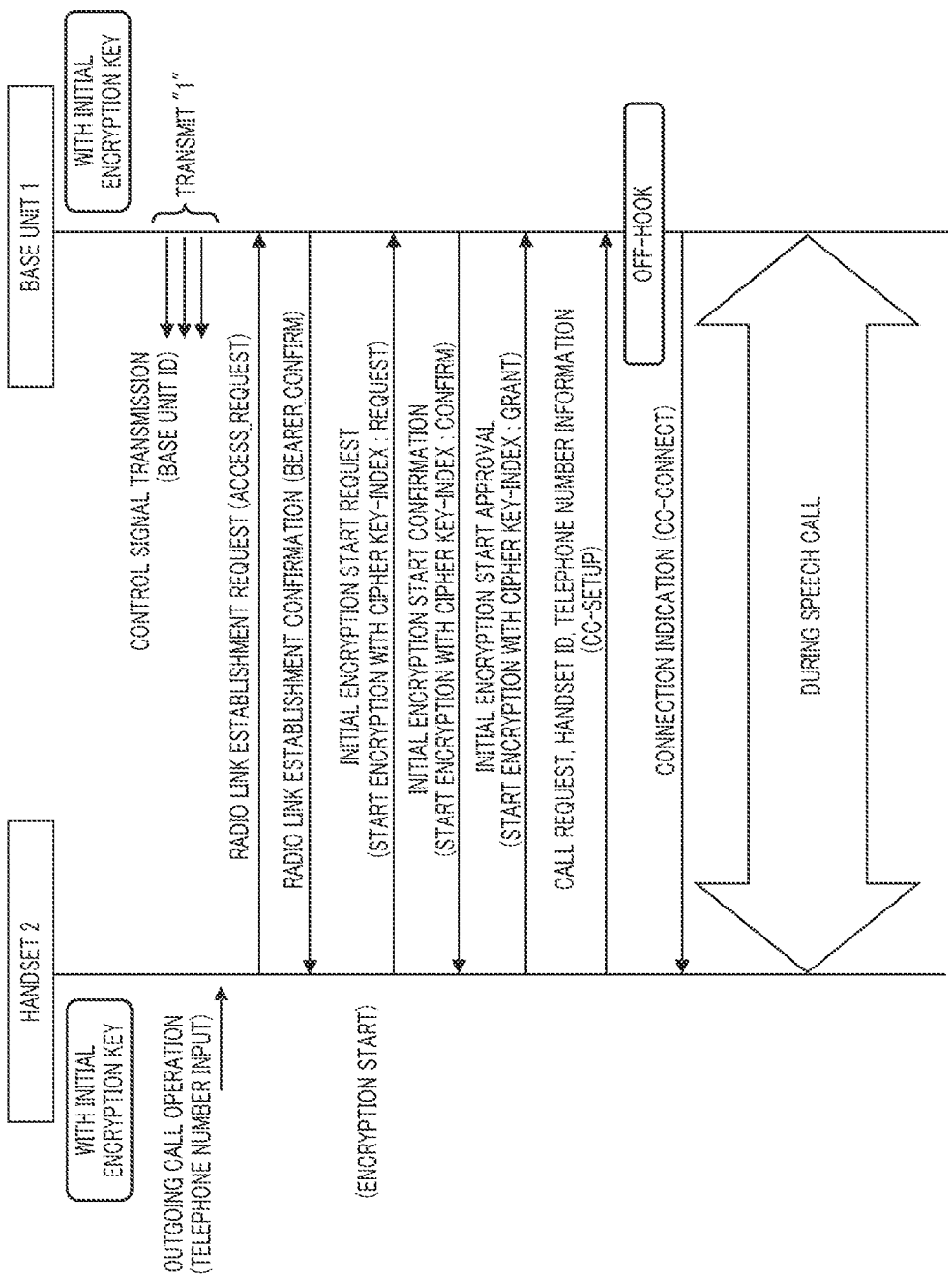
FIG. 10 shows a diagram illustrating an example of signals to be transmitted and received by radio communication for speech communication between a base unit and a handset to which the initial encryption key has been assigned, according to Embodiment 1 of the present invention.

Next, an explanation is given of an operation example of the external line transmission of a cordless telephone using the above-mentioned radio communication apparatus of the present invention. FIG. 10 shows a diagram illustrating an example of signals to be transmitted and received by radio communication at the time of the external line transmission of handset 2 and base unit 1.

The external line transmission is activated by performing outgoing call operation in which the user of handset 2 inputs a telephone number using operation section 24, for example. As illustrated in FIG. 10, when the external line transmission is activated, a radio link is established in the same way as the position registration operation by encrypted communication in FIG. 7 described above, and the activation of encrypted communication is performed. Further, after the activation of the encrypted communication is completed, handset 2 transmits an initial encryption start approval to base unit 1 by the encrypted communication. Further, when an initial encryption start confirmation is transmitted from base unit 1, handset 2 transmits an initial encryption start approval to base unit 1 and subsequently transmits a call request including the handset ID and telephone number information to base unit 1.

Upon receipt of the call request, control section 18 of base unit 1 controls line processing section 17 so as to enter an off-hook state, and outputs received telephone number information to a telephone line. Radio communication section 11, speech processing section 12, and line processing section 17 are controlled so as to perform speech connection between the telephone line and handset 2. Further, connection indication is transmitted to handset 2.

Upon receipt of the connection indication, control section 27 of handset 2 controls radio communication section 21 and speech processing section 22 so as to enter a call state.

In the case of the radio communication of the DECT system, the above-mentioned call request in the outside line transmission is a NWK-layer control message called "C-SETUP" and the connection indication is a NWK-layer control message called "CC-CONNECT."

As described above, in a case where the cordless telephone using the radio communication apparatus of the present invention performs outside line transmission, encrypted communication using the initial encryption key is started immediately after the radio link is established between base unit 1 and handset 2, and a message to indicate the calling party's telephone number input by the user to base unit 1 is also transmitted and received by encrypted communication, which in turn, makes it possible to reduce the risk that the information indicating to whom the call is being made is found out by a third party by wiretapping.

Moreover, in the radio communication apparatus of the present embodiment, the generation of an encryption key is performed only in a case where a position registration request is not made by encrypted communication (which is illustrated in FIG. 8, for example) after the initial position registration (with the initial encryption key). In addition, the generation of the encryption key is not performed in a case where the position registration request succeeds by encrypted communication (which is illustrated in FIG. 7, for example). Thus, the number of times an encryption key is generated and the number of times an encryption key is stored can be reduced to the minimum. As a result, the radio communication apparatus of the present embodiment can suppress the risk of a communication error that may occur during transmission of the information for key generation to the other party or an error that may occur during writing of a generated key to a storage apparatus such as an EEPROM.

Moreover, according to the present embodiment, it is made easier to secure the maximum number of rewritable times of the storage apparatus used for storing the encryption key. That is, even in the case of using an EEPROM with a limited number of rewritable times, it is possible to reduce a possibility of the number of rewritable times exceeding the maximum number of rewritable times during a use period and to realize a cost reduction.

Moreover, according to the present embodiment, it is possible to suppress the risk of the mechanism of encryption key generation or the encryption key being found out by a third party by wiretapping. Moreover, since an encryption key is generated by radio communication performed in normal operation, even in a case where a handset is added later, the encryption key can be easily generated. Moreover, when a plurality of handsets are present, generating an encryption key by radio communication for each of the handsets while changing the numerical value used in generating the encryption key to be transmitted from base unit 1 for each of the handsets makes it possible to assign the encryption key that varies every handset and enhance the safety of encryption.

Embodiment 2

In the present embodiment, an explanation is given of a case where base unit 1 and handset 2 perform position registration without an initial encryption key and operate so as to generate the initial encryption key after the position registration. Here, the configuration of the radio communication apparatus of Embodiment 2 is the same as the configurations in FIG. 2 and FIG. 3 of Embodiment 1, so that the explanation is omitted.

Figure 11:
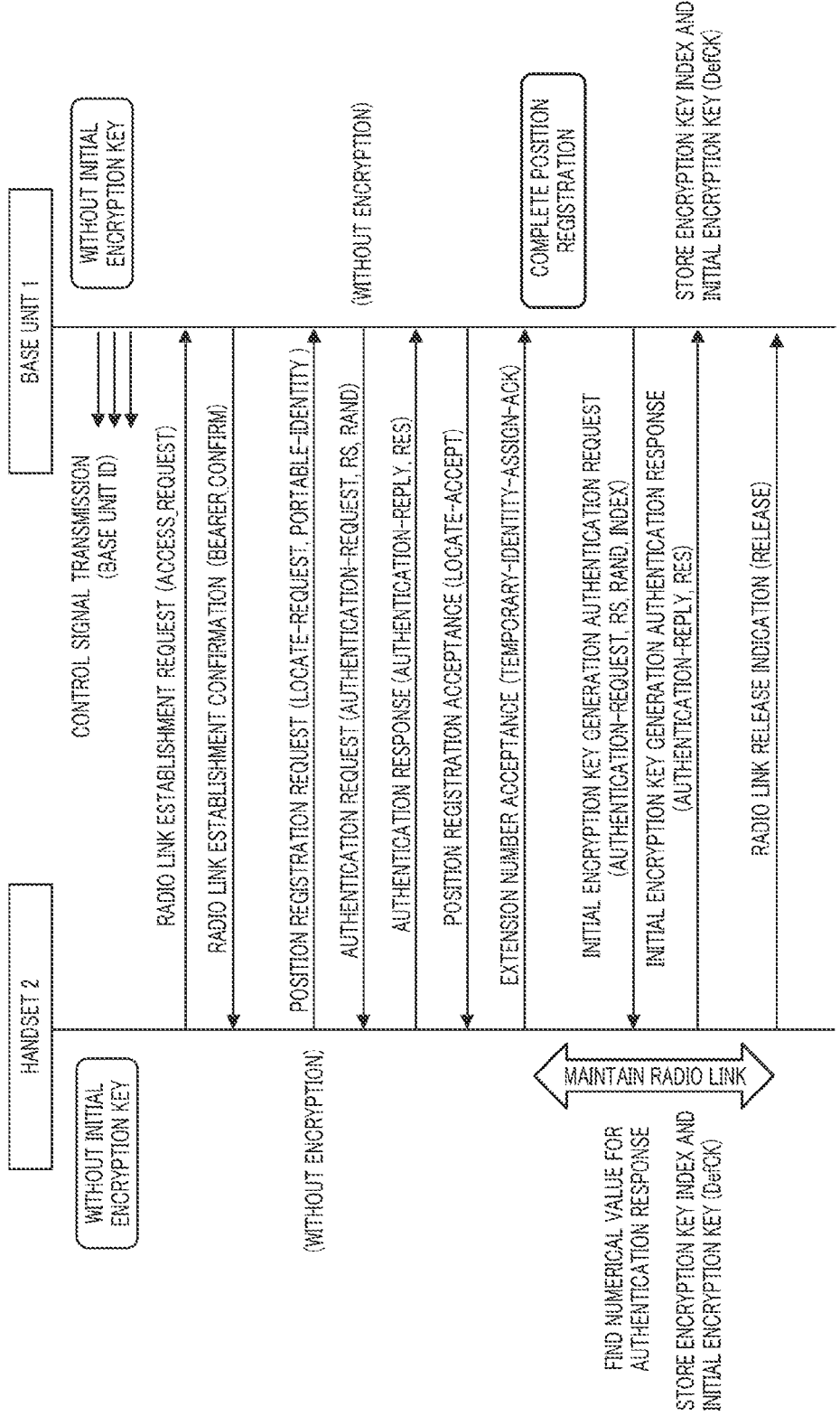
FIG. 11 shows a diagram illustrating an example of signals to be transmitted and received by radio communication for position registration of a base unit and a handset before the initial encryption key is assigned, according to Embodiment 2 of the present invention.

First, an explanation is given of operation in which base unit 1 assigns the initial encryption key to handset 2 before the initial encryption key is not assigned. FIG. 11 shows a diagram illustrating an example of signals to be transmitted and received by radio communication for position registration by base unit 1 and handset 2 before the initial encryption key is assigned in Embodiment 2. Here, signals having the similar functions to the signals illustrated in FIG. 6, FIG. 7 or FIG. 8 that describes the operation of handset 2 and base unit 1 of Embodiment 1 are expressed with the same names in FIG. 11, and detailed explanation about the signal functions or the like is omitted.

As illustrated in FIG. 11, handset 2 and base unit 1 of Embodiment 2 establish a radio link between handset 2 and base unit 1 by transmitting and receiving a radio link establishment request and a radio link establishment confirmation.

In Embodiment 2, when the radio link is established, handset 2 transmits a position registration request to base unit 1 without encryption. Base unit 1 having received the position registration request from handset 2 transmits an authentication request for handset authentication to handset 2 without encryption. Further, handset 2 transmits an authentication response to base unit 1 without encryption, and subsequently, base unit 1 transmits a position registration acceptance to handset 2 without encryption. Information on the position registration acceptance includes the latest extension number to be assigned to handset 2 at that time, and handset 2 having received this transmits an extension number acceptance showing that the extension number has been accepted to base unit 1, and the position registration is completed. Thus, handset 2 and base unit 1 perform a transaction from the position registration request to the extension number acceptance without encryption. After the position registration is completed, handset 2 maintains a state where the radio link is established.

In a case where the position registration is not performed by encrypted communication as described above, a procedure for encryption key generation is started while handset 2 maintains the radio link after the position registration is completed. That is, base unit 1 transmits an initial encryption key generation authentication request (AUTHENTICATION-REQUEST, RS, RAND, Index). This initial encryption key generation authentication request includes two numerical values (RS, RAND) to be used in calculation for handset authentication as well as the example in FIG. 6.

Handset 2 having received this request extracts an index, generates the initial encryption key and RES that is a sequence to confirm the initial encryption key on the basis of the above-mentioned RS and RAND and information on an authentication key (UAK), and stores the initial encryption key and the index. Moreover, handset 2 transmits an initial encryption key generation authentication response (AUTHENTICATION-REPLY, RES) including the RES and information indicating that the initial encryption key is generated, to base unit 1.

In base unit 1, after the above-mentioned initial encryption key generation authentication request is transmitted to handset 2, the initial encryption key and the RES that is the sequence to confirm the initial encryption key are generated based on information on the RS, the RAND and the authentication key (UAK). Further, upon receipt of the initial encryption key generation authentication response including the RES transmitted from handset 2, base unit 1 examines whether the self-generated RES and the RES transmitted from handset 2 match each other. In a case where both match each other, base unit 1 recognizes that handset 2 has the identical encryption key, and stores the initial encryption key and the index. Thus, the initial encryption key generation authentication request and the initial encryption key generation authentication request response are exchanged while handset 2 maintains the radio link, both base unit 1 and handset 2 store the index and the initial encryption key and transmit and receive a radio link release indication, and the communication is terminated.

As mentioned above, according to Embodiment 2, in a case where information on the initial encryption key is not stored in information storage section 26, control section 27 of handset 2 performs control so as to maintain the radio link during a certain time period after transmitting an extension number acceptance. During this time, control section 18 of base unit 1 transmits an initial encryption key generation authentication request on the basis of a state where the above-mentioned position registration is not performed by encrypted communication, and base unit 1 waits for an initial encryption key generation authentication response from handset 2.

Upon receipt of the initial encryption key generation authentication request from base unit 1 while the radio link is maintained, control section 27 of handset 2 performs control so as to transmit the initial encryption key generation authentication response to base unit 1, store the index and the initial encryption key in information storage section 26, transmit the radio link release indication and terminate the communication.

Meanwhile, upon receipt of the initial encryption key generation authentication response from handset 2, in a case where the authentication result is correct, control section 18 of base unit 1 also stores the index and the initial encryption key in information storage section 16. Further, it performs control so as to terminate communication when the radio link release indication is received.

Thus, in a case where information on the initial encryption key is not stored in its own information storage section 26, handset 2 transmits a position registration request without encryption, with this as a chance, handset 2 and base unit 1 operate up to the reception of the extension number without encryption, and handset 2 and base unit 1 generate the initial encryption key while the radio link is maintained thereafter. By this means, even in a case where there is a position registration request from handset 2 before the initial encryption key is assigned, it is possible to complete processing up to the initial encryption key generation without disconnecting the radio link, and it is possible to shorten the time of processing required for handset 2 and base unit 1 to start communication using an encryption key.

Figure 12:
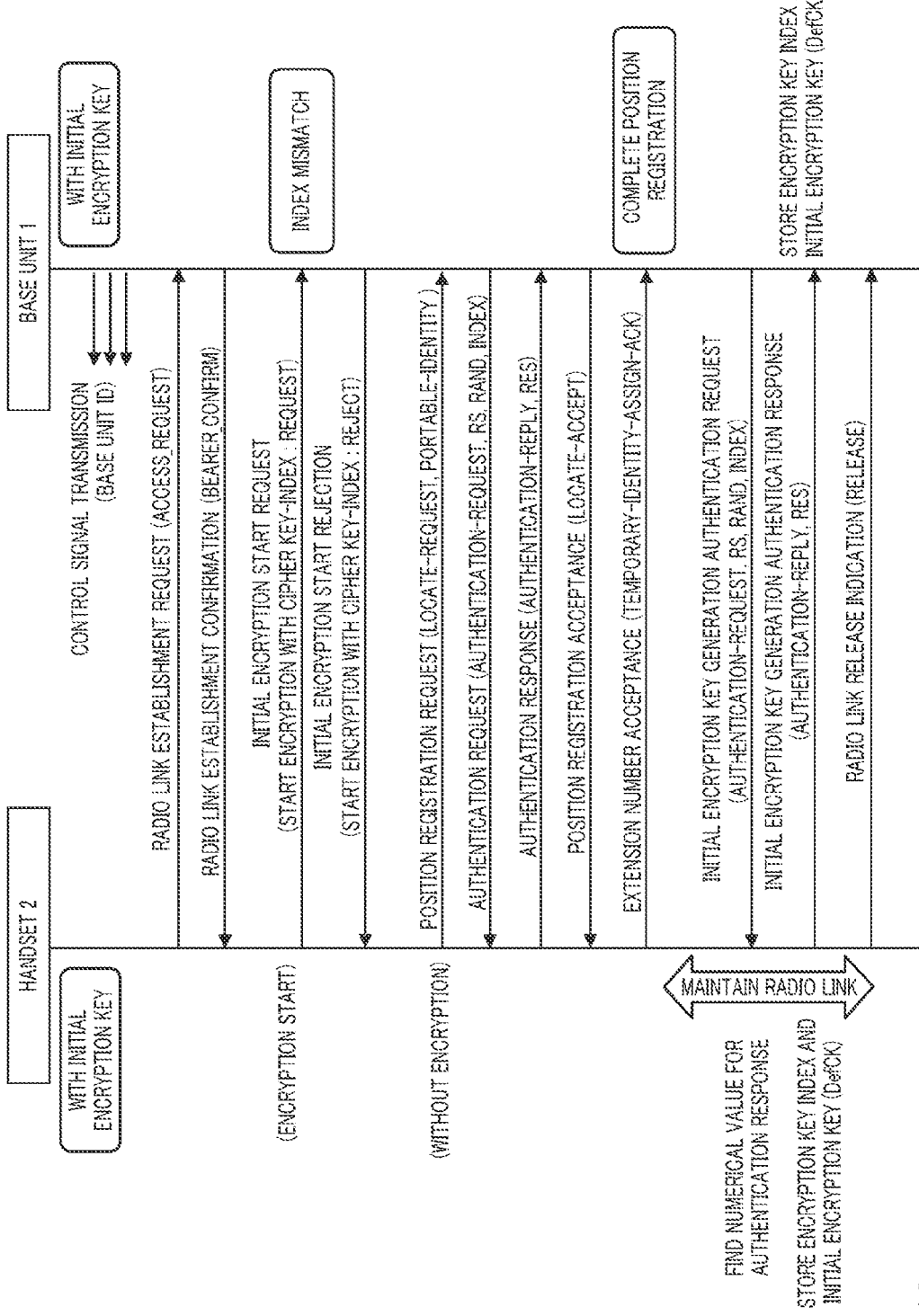
FIG. 12 shows a diagram illustrating an example of signals to be transmitted and received by radio communication for position registration of a base unit and a handset in a case where encrypted communication using the initial encryption key is rejected, according to Embodiment 2 of the present invention.

Next, an explanation is given of operation where base unit 1 assigns the initial encryption key if base unit 1 does not hold the initial encryption key of an index designated by handset 2 when handset 2 to which the initial encryption key has been assigned requests a radio link establishment to base unit 1. FIG. 12 shows a diagram illustrating an example of signals to be transmitted and received by radio communication for position registration between base unit 1 and handset 2 to which the initial encryption key has been assigned in Embodiment 2. Here, signals having the similar functions to the signals illustrated in FIG. 6, FIG. 7 or FIG. 8 that describes the operation of handset 2 and base unit 1 of Embodiment 1 are expressed with the same names in FIG. 12, and detailed explanation about the signal functions or the like is omitted.

As illustrated in FIG. 12, handset 2 and base unit 1 of Embodiment 2 establish a radio link between handset 2 and base unit 1 by transmitting and receiving a radio link establishment request and a radio link establishment confirmation.

The initial encryption key is assigned to handset 2 once and the initial encryption key is stored in information storage section 26. In this case, handset 2 activates encrypted communication using the initial encryption key stored in information storage section 26, and, thereafter, handset 2 transmits an initial encryption start request to base unit 1 by encrypted communication.

Base unit 1 examines whether the initial encryption key of an index designated by the initial encryption start request from handset 2 is stored in information storage section 16, and in a case where it is not stored, transmits an initial encryption start rejection (start encryption with cipher key-index: reject). Handset 2 having received this initial encryption start rejection releases encrypted communication, switches to operation without encryption and starts a procedure of position registration.

Thereafter, similar to the operation in which base unit 1 assigns the initial encryption key to handset 2 before the initial encryption key assignment above described using FIG. 11, communication is performed without encryption even in FIG. 12. Handset 2 transmits a position registration request to exchange an authentication request and authentication response for handset authentication, base unit 1 transmits a position registration acceptance including the extension number, handset 2 transmits an extension number acceptance, and the position registration is completed.

After the position registration is completed, control section 27 of handset 2 does not immediately transmit a radio link release indication on the basis of the reception of the above-mentioned initial encryption start rejection from base unit 1, and handset 2 and base unit 1 maintain the radio link. Moreover, based on that the position registration is not performed by encrypted communication, control section 18 of base unit 1 transmits an initial encryption key generation authentication request, and base unit 1 waits for an initial encryption key generation authentication response from handset 2. Thus, based on that the position registration is not performed by encrypted communication, base unit 1 and handset 2 exchange the initial encryption key generation authentication request and the initial encryption key generation authentication request response, generate the initial encryption key and store the index and the initial encryption key.

That is, in Embodiment 2, in a case where the indexes do not match in base unit 1 as illustrated in FIG. 12, even if information related to the initial encryption key is stored in information storage section 26 after the extension number acceptance is transmitted, control section 27 of handset 2 performs control so as to maintain the radio link for a certain period of time in a case where the activation of encrypted communication using the initial encryption key is rejected. Further, control section 27 of handset 2 performs control so as to transmit a handset initial encryption key generation authentication response upon receipt of the initial encryption key generation authentication request while the radio link is maintained, rewrite the index and the initial encryption key in information storage section 26, transmit the radio link release indication and terminate the communication. On the other hand, upon receipt of the handset initial encryption key generation authentication response, in a case where the authentication result is correct, control section 18 of base unit 1 performs control so as to store the index and the initial encryption key in information storage section 16 and terminate the communication upon receipt of the radio link release indication.

As described above, even when handset 2 stores the initial encryption key in its own information storage section 26, in a case where the position registration by encrypted communication using the initial encryption key does not succeed, handset 2 and base unit 1 operate from position registration to extension number acceptance without encryption and thereafter generate the initial encryption key while maintaining the radio link. Therefore, even in a case where there is a position registration request from handset 2 in a state where the encryption keys do not match in handset 2 and base unit 1, it is possible to complete processing up to the initial encryption key generation without disconnecting the radio link and shorten the time of processing required for handset 2 and base unit 1 to be able to start communication using an encryption key.

In the above, an explanation has been given using FIG. 11 to the operation where base unit 1 assigns the initial encryption key to handset 2 before the initial encryption key is assigned, and an explanation has been given using FIG. 12 to the operation where the position registration is requested from handset 2 to which the initial encryption key has been assigned, the encryption key indices are not matched between handset 2 and base unit 1 and base unit 1 reassigns the initial encryption key. Here, in a case where there are provided a valid index and initial encryption key for base unit 1 and handset 2, the initial encryption key is not assigned at the time of position registration.

Signals transmitted and received by radio communication for the position registration in a case where there are provided the valid index and initial encryption key for base unit 1 and handset 2, are the same as the case of Embodiment 1 described using FIG. 7. As illustrated in FIG. 7, in a case where the position registration is performed by encrypted communication, handset 2 according to Embodiment 2 immediately transmits the radio link release indication once the extension number acceptance is transmitted and the position registration is completed, and the radio communication is terminated.

Thus, by adopting a configuration in which the procedure of position registration is tried by encrypted communication, whether to generate a common key or perform communication using a prior common key is decided depending on whether the position registration is correctly performed, it is possible to transmit information for key generation to the other party and suppress the risk of error that can occur at the time of storing the generated key in a storage apparatus.

Figure 13A:
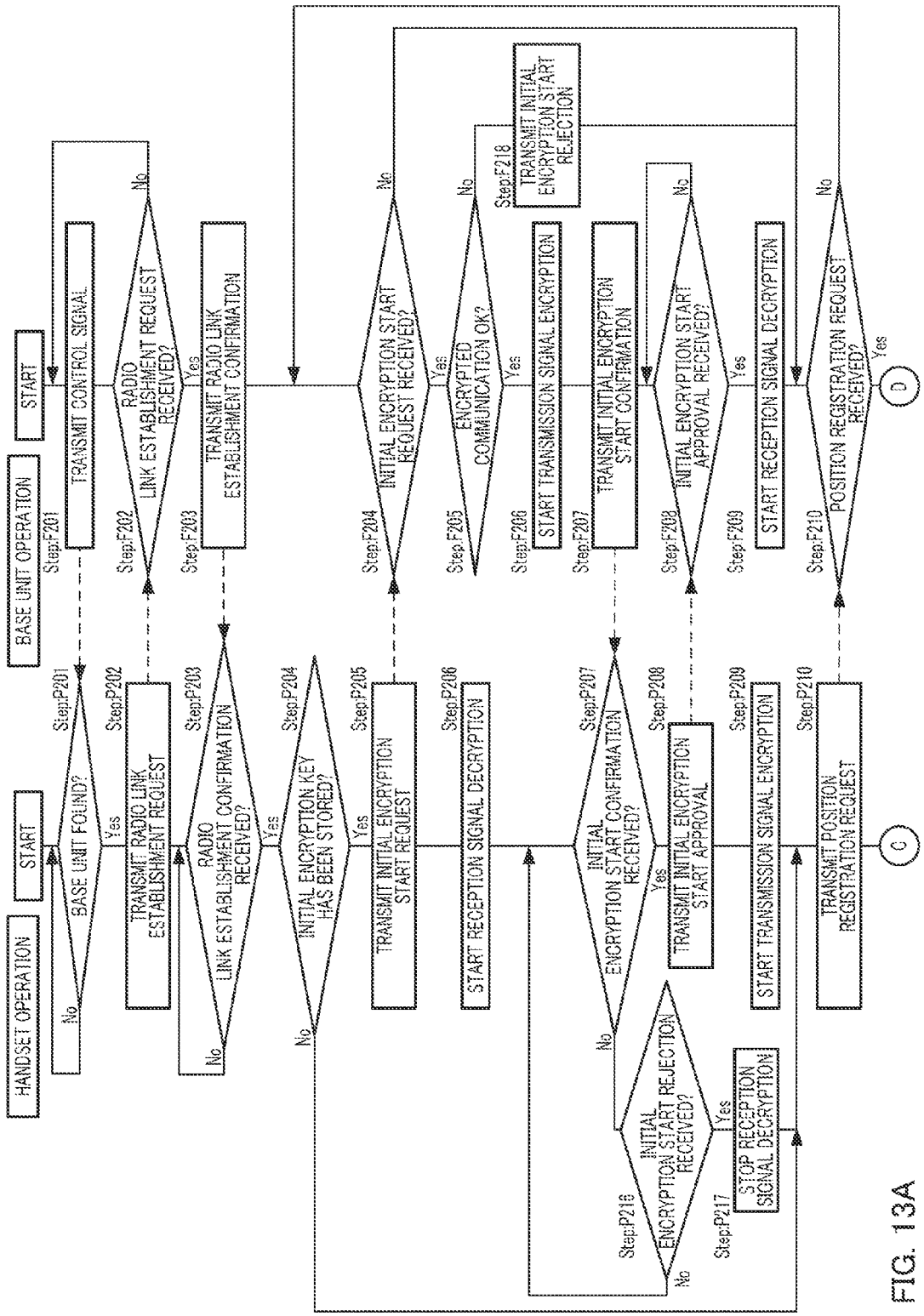
FIG. 13A shows a flowchart illustrating an example of operation of a base unit and a handset at the time of position registration and initial encryption key assignment, according to Embodiment 2 of the present invention.
Figure 13B:
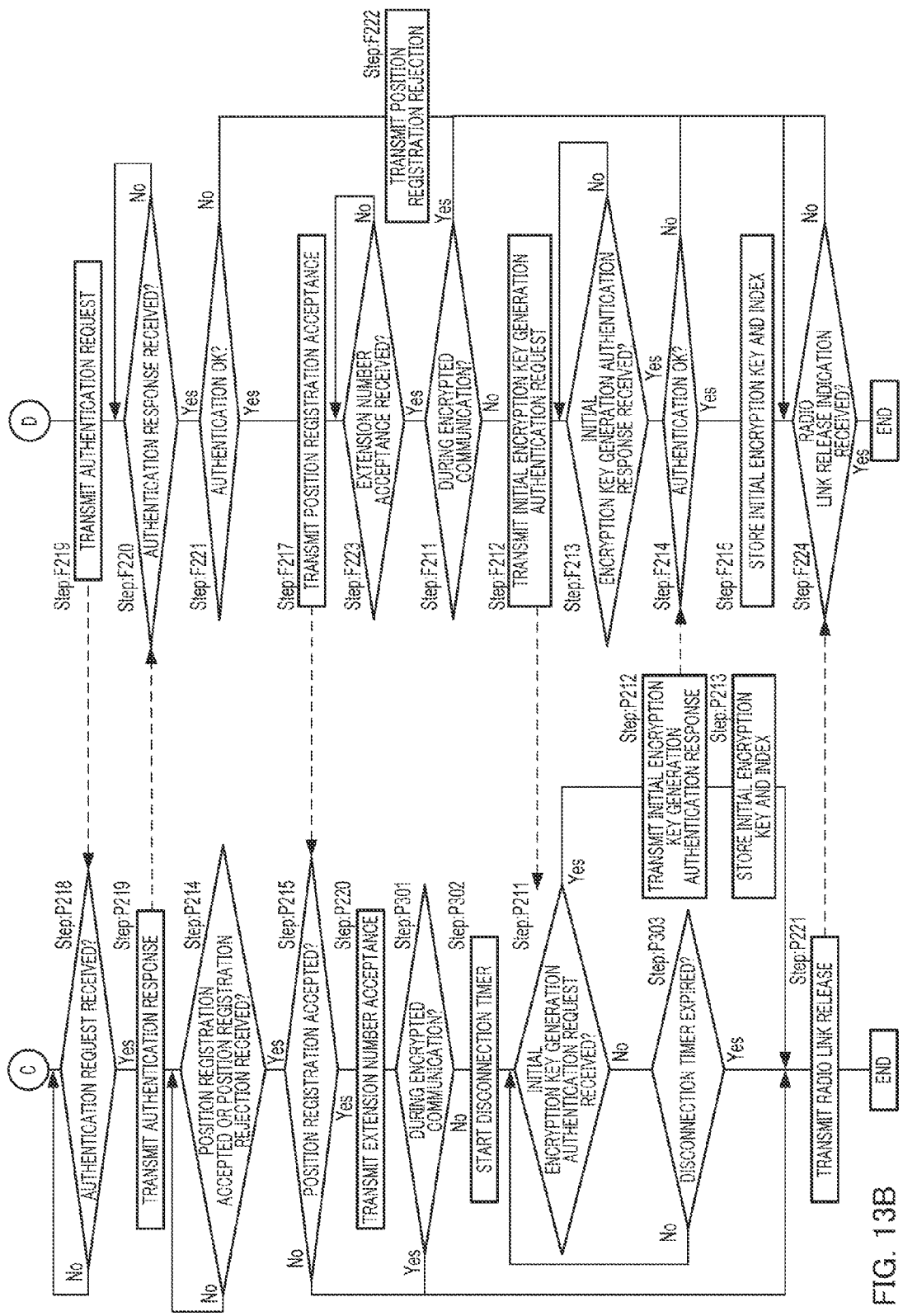
FIG. 13B shows a flowchart illustrating an example of operation of a base unit and a handset at the time of position registration and initial encryption key assignment, according to Embodiment 2 of the present invention.

Next, the operation of position registration is described using FIG. 13A and FIG. 13B. FIG. 13A and FIG. 13B show flowcharts illustrating one example of the operation of position registration in base unit 1 and handset 2 of Embodiment 2. In FIG. 13A and FIG. 13B, the same numbers are assigned to blocks showing the similar operation or state to the flowcharts of FIG. 9A and FIG. 9B in Embodiment 1. Here, operation from "Start" to Step: P210 to transmit a position registration request in the operation at the time of the position registration of handset 2 in Embodiment 2 illustrated in FIG. 13A and FIG. 13B is the same as the operation of handset 2 in Embodiment 1 described using FIG. 9A and FIG. 9B, so that the explanation is omitted. Similarly, operation from "Start" to Step: F210 to receive the position registration request in the operation at the time of the position registration of base unit 1 in Embodiment 2 illustrated in FIG. 13A and FIG. 13B is the same as the operation of base unit 1 in Embodiment 1 described using FIG. 9A and FIG. 9B, so that the explanation is omitted.

First, an explanation is given of the case of an operation example of position registration by encrypted communication illustrated in FIG. 7. Control section 18 of base unit 1 establishes a radio link, completes the activation of encrypted communication by initial encryption, and, upon receipt of a position registration request (Step: F210, Yes), generates two numerical values for handset authentication to transmit an authentication request including two numerical values for handset authentication (Step: F219).

Control section 27 of handset 2 establishes the radio link, completes the activation of the encrypted communication by the initial encryption, and after transmitting the position registration request (Step: P210), waits for the authentication request (Step: P218). In a case where the received message is the authentication request in Step: P218 (Step: P218, Yes), control section 27 of handset 2 finds the RES for handset authentication from an authentication key stored in information storage section 26 and two numerical values indicated by the authentication request, and transmits an authentication response including this RES (Step: P219).

After transmitting the authentication response (Step: F219), control section 18 of base unit 1 waits for the authentication request (Step: F220). Upon receipt of the authentication response (Step: F220, Yes), control section 18 of base unit 1 finds a numerical value for authentication from an authentication key stored in information storage section 16 and two numerical values transmitted by the authentication request, and compares it with the RES for handset authentication indicated from handset 2 by the authentication response (Step: F221). In a case where both are equal (Step: F221, Yes), control section 18 of base unit 1 determines the extension number of handset 2 and transmits a position registration acceptance including information on the extension number of handset 2 (Step: F217). Further, control section 18 of base unit 1 waits for an extension number acceptance (Step: F223).

After transmitting the authentication response (Step: P219), control section 27 of handset 2 waits for the position registration acceptance or a position registration rejection (Step: P214). Further, upon receipt of the position registration acceptance or the position registration rejection (Step: P214, Yes), it is determined whether the received message is the position registration acceptance (Step: P215). In a case where the received message is the position registration acceptance in Step: P215 (Step: P215, Yes), control section 27 of handset 2 transmits the extension number acceptance (Step: P220) and determines whether the activation of encrypted communication is completed in the radio link in which the position registration is performed (Step: P301). In a case where the position registration is performed by encrypted communication (Step: P301, Yes), control section 27 of handset 2 transmits a radio link release (Step: P221) to terminate the control of the position registration with base unit 1.

Upon receipt of the extension number acceptance (Step: F223, Yes), control section 18 of base unit 1 determines whether the activation of encrypted communication is completed in the radio link in which the position registration is performed (Step: F211). In a case where the position registration is performed by the encrypted communication (Step: F211, Yes), control section 18 of base unit 1 waits for a radio link release indication (Step: F224). Upon receipt of the radio link release indication (Step: F224, Yes), the control of the position registration with handset 2 is terminated.

Next, using FIG. 13A and FIG. 13B, an explanation is given of an operation example of assigning an initial encryption key in position registration in a case where the initial encryption key assignment illustrated in FIG. 11 is not completed. Here, operation from the transmission of an extension number acceptance by handset 2 (Step: P220) to the reception of the extension number acceptance by base unit 1 (Step: F223) is the same as above, except for that encrypted communication by the initial encryption is not activated after a radio link is established, so that the explanation is omitted.

Control section 27 of handset 2 transmits the extension number acceptance (Step: P220) and determines whether the activation of the encrypted communication is completed in the radio link in which the position registration is performed (Step: P301). In a case where the position registration is not performed by encrypted communication (Step: P301, No), control section 27 of handset 2 activates a disconnection timer (Step: P302) while waiting for an initial encryption key generation authentication request from base unit 1 (Step: P211). Control section 27 of handset 2 monitors the disconnection timer (Step: P303). In a case where it is not possible to receive the initial encryption key generation authentication request from base unit 1 in a certain period of time (Step: P211, No), that is, in a case where the disconnection timer expires (Step: P303, Yes), control section 27 of handset 2 transmits a radio link release (Step: P221) and terminates the control of the position registration with base unit 1.

Upon receipt of the extension number acceptance (Step: F223, Yes), control section 18 of base unit 1 determines whether the activation of encrypted communication is completed in the radio link in which the position registration is performed (Step: F211). In a case where the position registration is not performed by encrypted communication (Step: F211, No), the initial encryption key generation authentication request is transmitted (Step: F212).

Upon receipt of a message of the initial encryption key generation authentication request in Step: P211 (Step: P211, Yes), control section 27 of handset 2 finds a numerical value to be used for handset authentication from the authentication key stored in information storage section 26 and two numerical values indicated by the initial encryption key generation authentication request, and transmits an initial encryption key generation authentication response including this numerical value (RES for handset authentication) to be used for handset authentication (Step: P212). Further, control section 27 of handset 2 finds the initial encryption key from the authentication key stored in information storage section 26 and two numerical values notified by the initial encryption key generation authentication request, and stores it in information storage section 26 together with the index indicated by the initial encryption key generation authentication request (Step: P213). Further, control section 27 of handset 2 transmits the radio link release (Step: P221) and terminates the control of the position registration with base unit 1.

After transmitting the initial encryption key generation authentication request (Step: F212), control section 18 of base unit 1 waits for the initial encryption key generation authentication response (Step: F213). Upon receipt of the initial encryption key generation authentication response (Step: F213, Yes), control section 18 finds a numerical value for authentication from the authentication key stored in information storage section 16 and two numerical values transmitted by the initial encryption key generation authentication request, and compares it with the RES for handset authentication indicated from handset 2 by the initial encryption key generation authentication response (Step: F214).

In a case where both are equal (Step: F214, Yes), control section 18 of base unit 1 finds the initial encryption key from the authentication key stored in information storage section 16 and two numerical values indicated by the initial encryption key generation authentication request, and stores it in information storage section 26 together with the index indicated by the initial encryption key generation authentication request (Step: F215). Further, it waits for the radio link release indication (Step: F224). Upon receipt of the radio link release indication (Step: F224, Yes), control section 18 of base unit 1 terminates the control of the position registration with handset 2.

Here, in a case where the RES for handset authentication indicated by the initial encryption key generation authentication response and the numerical value found from the numerical value stored in information storage section 16 of base unit 1 are not equal in Step: F214 (Step: F214, No), control section 18 of base unit 1 waits for the radio link release indication without storing the initial encryption key and the index (Step: F224) and terminates the position registration control in the same way as above.

Next, using FIG. 13A and FIG. 13B, an explanation is given of an operation example where base unit 1 rejects a request of encrypted communication by the initial encryption key illustrated in FIG. 12 and assigns the initial encryption key after position registration is terminated. In this case, operation in which base unit 1 rejects the request for encrypted communication by the initial encryption key, that is, the operation from "Start" to Step: P210 to transmit a position registration request in handset 2 and the operation from "Start" to Step: F210 to receive the position registration request in the operation at the time of the position registration in base unit 1 are the same as the operation in Embodiment 1 described using FIG. 9A and FIG. 9B. Moreover, the operation after Step: P210 of handset 2 and the operation after Step: F210 of base unit 1 are the same as the operation in a case where the initial encryption key assignment is not completed in above-mentioned Embodiment 2.

The operation in Embodiment 2 has been described above. As described above, an initial encryption key is assigned after position registration in Embodiment 2. In devices that perform radio communication of the DECT system, this is beneficial in the interconnection between a device that supports early encryption and a device that does not support the early encryption. That is, in a state where the initial encryption key assignment is not completed, the sequence up to position registration completion is the same as the sequence between base unit 1 and handset 2 that do not support the early encryption, even if a device that supports the early encryption and a device that does not support the early encryption are used in combination, there is a lower risk of causing a malfunction in the operation of position registration.

In the above, an example of assigning an initial encryption key during a position registration sequence has been described in Embodiment 1, and an example of assigning the initial encryption key after the position registration sequence has been described in Embodiment 2. In handset 2, it is possible to adopt a configuration combining both of these operations. That is, in a case where the initial encryption key assignment is waited for during the position registration sequence, the initial encryption key assignment is not completed and the initial encryption key assignment is not performed during the position registration, radio communication may be maintained for a certain period of time like handset 2 in Embodiment 2 after the position registration, and the activation of an initial encryption key assignment sequence may be waited for.

As described above, since the radio communication apparatus of the present invention normally performs operation so as to generate and store data of an initial encryption key or the like required for encrypted communication using radio communication between base unit 1 and handset 2 once, it is not necessary to consider the limited number of rewritable times or the like even in a case where a versatile EEPROM is used as a storage medium to store data of the initial encryption key or the like required for the encrypted communication, and there is an advantage in that the writing of data can be managed more easily.

Moreover, data of the initial encryption key or the like required for the encrypted communication is generated and stored in a case where a sequence implemented in normal operation such as position registration is not performed by encrypted communication. Thus, it is possible to generate and store data of the initial encryption key or the like again even in case of a failure in storing the data due to abnormal operation such as power discontinuity at the time of data storage, and to prevent a communication failure caused due to an abnormality in data such as an initial encryption key or the like.

Moreover, data such as an initial encryption key required for the encrypted communication is generated and stored even in a case where the sequence implemented in the normal operation such as the position registration is not performed by the encrypted communication. Thus, periodically performing position registration that does not depend on the encrypted communication, for example, makes it possible to change the data such as the initial encryption key or the like, and makes it possible to reduce the risk of leakage of the initial encryption key.

INDUSTRIAL APPLICABILITY

The radio communication apparatus according to the present invention is useful as a radio communication apparatus such as a cordless telephone.

REFERENCE SIGNS LIST

1 Base unit
2, 3 Handset
11, 21 Radio communication section
12, 22 Speech processing section
13, 23 Indication section
14, 24 Operation section
15, 25 Display section
16, 26 Information storage section
17 Line processing section
18, 27 Control section

The invention claimed is:
1. A base-unit-side (master-side) radio communication apparatus that performs encrypted communication using a common encryption key with a handset-side (slave-side) radio communication apparatus, the base-unit-side radio communication apparatus comprising:
a radio communication section that establishes a radio link and transmits and receives control data and speech data for telephone call; and an information storage section that stores an encryption key, wherein:

when receiving an encrypted-communication activation request including information indicating an encryption key from the handset-side radio communication apparatus after establishing a radio link with the handset-side radio communication apparatus, the radio communication section activates encrypted communication with the handset-side radio communication apparatus in a case where an encryption key corresponding to the received information indicating the encryption key is stored in the information storage section; and when receiving a signal different from the encrypted communication activation request transmitted from the handset-side radio communication apparatus, the radio communication section transmits a signal to request generation of a new common encryption key to the handset-side radio communication apparatus, using an unencrypted signal in a case where the received signal is not encrypted.

2. The base-unit-side radio communication apparatus according to claim 1, wherein, when receiving a position registration request not encrypted using an encryption key from the handset-side radio communication apparatus, the radio communication section determines that the handset-side radio communication apparatus includes no encryption key, and transmits a signal to request generation of an initial encryption key to the handset-side radio communication apparatus.

3. The base-unit-side radio communication apparatus according to claim 1, wherein the information storage section includes a nonvolatile memory.

4. The base-unit-side radio communication apparatus according to claim 1, wherein the information storage section stores, as information on the handset-side radio communication apparatus, a handset identification code (handset ID in embodiments) and an authentication key to identify and authenticate a registered handset, an encryption index to be used for encrypted communication, and an encryption key to be stored in pair with the encryption index.

5. A base-unit-side radio communication apparatus that performs encrypted communication using a common encryption key with a handset-side radio communication apparatus, the base-unit-side radio communication apparatus comprising:

a radio communication section that establishes a radio link and transmits and receives control data and speech data for telephone call; and an information storage section that stores an encryption key, wherein:

when receiving a signal to request encrypted communication with a specified encryption key from the handset-side radio communication apparatus after establishing a radio link with the handset-side radio communication apparatus, the radio communication section transmits a signal to reject encrypted communication to the handset-side radio communication apparatus via the radio communication section in a case where the information storage section does not store the specified encryption key; and when receiving a position registration request that is not encrypted using an encryption key from the handset-side radio communication apparatus, the radio communication section transmits a signal to request generation of an initial encryption key to the handset-side radio communication apparatus.

6. The base-unit-side radio communication apparatus according to claim 5, wherein:

when receiving a signal to request position registration that is not encrypted using an encryption key from the handset-side radio communication apparatus, the radio communication section transmits a signal to request generation of a new common encryption key to the handset-side radio communication apparatus; and the radio communication section completes the position registration after the new common encryption key is generated.

7. The base-unit-side radio communication apparatus according to claim 6, wherein the information storage section includes a nonvolatile memory.

8. A handset-side radio communication apparatus that performs encrypted communication with a base-unit-side radio communication apparatus, the handset-side radio communication apparatus comprising:

a radio communication section that establishes a radio link and transmits and receives control data and speech data for telephone call; and an information storage section that stores an encryption key, wherein:

when the radio communication section transmits a signal to the base-unit-side radio communication apparatus using a first encryption key, the radio communication section stops, upon reception of a signal indicating rejection from the base-unit-side radio communication apparatus after transmitting the signal using the first encryption key, the transmission of the signal using the first encryption key, and transmits an unencrypted position registration request to the base-unit-side radio communication apparatus; and the radio communication section newly generates a second encryption key common to the base-unit-side radio communication apparatus and causes the information storage section to store the second encryption key.

9. The handset-side radio communication apparatus according to claim 8, wherein the information storage section includes a nonvolatile memory.

10. The handset-side radio communication apparatus according to claim 8, wherein the information storage section stores, together with an encryption index, an encryption key to be used for encrypted communication.

11. A radio communication apparatus including a base-unit-side (master side) radio communication apparatus and a handset-side (slave-side) radio communication apparatus that perform encrypted communication using a common encryption key, wherein:

when the handset-side radio communication apparatus includes an encryption key, the handset-side radio communication apparatus transmits a signal that is encrypted using the encryption key to the base-unit-side radio communication apparatus;

when the base-unit-side radio communication apparatus receives the encrypted signal from the handset-side radio communication apparatus and when the encryption key included in the base-unit-side radio communication apparatus and the encryption key of the received signal match each other, the base-unit-side radio communication apparatus starts encrypted communication with the handset-side radio communication apparatus;

when the base-unit-side radio communication apparatus receives the encrypted signal from the handset-side radio communication apparatus and when the encryption key included in the base-unit-side radio communication apparatus and the encryption key of the received signal do not match each other, the base-unit-side radio communication apparatus indicates rejection to the handset-side radio communication apparatus; and the handset-side radio communication apparatus stops encryption according to the indicated rejection and requests position registration to the base-unit-side radio communication apparatus using an unencrypted signal.

12. The radio communication apparatus according to claim 11, wherein, when the position registration is requested using the unencrypted signal from the handset-side radio communication apparatus after the rejection is indicated to the handset-side radio communication apparatus, the base-unit-side radio communication apparatus transmits a signal to generate a new common encryption key to the handset-side radio communication apparatus, using an unencrypted signal.

13. A radio communication apparatus including a base-unit-side (master side) radio communication apparatus and a handset-side (slave-side) radio communication apparatus that perform encrypted communication using a common encryption key, wherein:

when the handset-side radio communication apparatus does not include an encryption key, the handset-side radio communication apparatus requests position registration to the base-unit-side radio communication apparatus, using an unencrypted signal;

when the position registration is requested using the unencrypted signal from the handset-side radio communication apparatus, the base-unit-side radio communication apparatus performs processing of the position registration according to the request for the position registration; and upon reception of a signal indicating acceptance of the position registration transmitted from the base-unit-side radio communication apparatus after requesting the position registration to the base-unit-side radio communication apparatus using the unencrypted signal, the handset-side radio communication apparatus maintains a radio link for a certain period of time and waits for a signal to generate a new common encryption key to be transmitted from the base-unit-side radio communication apparatus.

14. A radio communication apparatus including a base-unit-side (master side) radio communication apparatus and a handset-side (slave-side) radio communication apparatus that perform encrypted communication using a common encryption key, wherein:

when the handset-side radio communication apparatus includes an encryption key, the handset-side radio communication apparatus transmits a signal that is encrypted using the encryption key to the base-unit-side radio communication apparatus;

the base-unit-side radio communication apparatus determines whether the encryption key used for the signal from the handset-side radio communication apparatus is the encryption key that is common to the base-unit-side radio communication apparatus, and when the encryption key is not common, the base-unit-side radio communication apparatus indicates that the encryption key is not common to the handset-side radio communication apparatus;

the handset-side radio communication apparatus requests position registration to the base-unit-side radio communication apparatus using an unencrypted signal according to the indication;

the base-unit-side radio communication apparatus performs processing of the position registration according to the request for the position registration; and upon reception of a signal indicating acceptance of the position registration transmitted from the base-unit-side radio communication apparatus, the handset side radio communication apparatus maintains a radio link for a certain period of time and waits for a signal to generate a new common encryption key transmitted from the base-unit-side radio communication apparatus.

15. An encryption key generation method in a radio communication apparatus that performs encrypted communication using a common encryption key, the method comprising:

transmitting, from a handset-side (slave-side) radio communication apparatus, when the handset-side radio communication apparatus includes an encryption key, a signal encrypted using the encryption key to a base-unit-side (master-side) radio communication apparatus;

indicating rejection to the handset-side radio communication apparatus by the base-unit-side radio communication apparatus, when the base-unit-side radio communication apparatus receives the encrypted signal from the handset-side radio communication apparatus and when the encryption key included in the base-unit-side radio communication apparatus and the encryption key of the received signal do not match each other; and stopping encryption by the handset-side radio communication apparatus according to the indicated rejection and requesting position registration by the handset-side radio communication apparatus to the base-unit-side radio communication apparatus using an unencrypted signal.

16. An encryption key generation method in a radio communication apparatus that performs encrypted communication using a common encryption key, the method comprising:

transmitting, from a handset-side (slave-side) radio communication apparatus, when the handset-side radio communication apparatus includes an encryption key, a signal that is encrypted using the encryption key to a base-unit-side (master-side) radio communication apparatus, and when the handset-side radio communication apparatus does not include an encryption key, an unencrypted signal to the base-unit-side radio communication apparatus;

determining, by the base-unit-side radio communication apparatus, based on the signal from the handset-side radio communication apparatus, whether the base-unit-side and handset-side radio communication apparatuses include the common encryption key, and when it is determined that the base-unit-side and handset-side radio communication apparatuses do not include the common encryption key, indicating to the handset-side radio communication apparatus by the base-unit-side radio communication apparatus that the base-unit-side and handset-side radio communication apparatuses do not include the common encryption key;

requesting position registration from the handset-side radio communication apparatus to the base-unit-side radio communication apparatus according to the indication, using an unencrypted signal;

performing, by the base-unit-side radio communication apparatus, processing of the position registration according to the request for the position registration; and maintaining, by the handset-side radio communication apparatus, a radio link for a certain period of time and waiting for a signal to generate a new common encryption key by the handset-side radio communication apparatus upon reception of a signal indicating acceptance of the position registration transmitted from the base-unit-side radio communication apparatus, the new common encryption key being transmitted from the base-unit-side radio communication apparatus.

* * * * *